United States Patent [19]
Ozawa et al.

[11] Patent Number: 5,911,301
[45] Date of Patent: Jun. 15, 1999

[54] APPARATUS FOR FIXING BOOTS OF A CONSTANT VELOCITY JOINT ASSEMBLY AND APPARATUS FOR POSITIONING THE JOINT ASSEMBLY FOR USE THEREIN

[75] Inventors: Mitsuharu Ozawa; Tomohiko Yamamoto; Takayuki Matsusima; Masahiro Takita, all of Mooka, Japan

[73] Assignee: Honda Giken Kogyo Kabushiki Kaisha, Tokyo, Japan

[21] Appl. No.: 08/799,608

[22] Filed: Feb. 12, 1997

[51] Int. Cl.$^6$ ...................................................... B65G 47/00
[52] U.S. Cl. ................................. 198/345.3; 198/867.02; 198/867.08
[58] Field of Search ........................... 198/345.3, 867.02, 198/867.08

[56] References Cited

U.S. PATENT DOCUMENTS

| | | | |
|---|---|---|---|
| 5,115,901 | 5/1992 | Santandrea et al. | 198/345.3 |
| 5,303,810 | 4/1994 | Tani | 198/345.3 |

FOREIGN PATENT DOCUMENTS

| | | |
|---|---|---|
| 2-76649 (A) | 3/1990 | Japan . |
| 4-201132 (A) | 7/1992 | Japan . |

*Primary Examiner*—Joseph E. Valenza
*Attorney, Agent, or Firm*—Merchant, Gould, Smith, Edell, Welter & Schmidt, P.A.

[57] ABSTRACT

In a constant-velocity-joint-assembly positioning system, a first boot positioning apparatus includes a clamping mechanism for clamping a central drive shaft of a constant velocity joint assembly, a right boot positioning mechanism for positioning a right boot of the joint assembly and a left boot positioning mechanism for positioning a left boot of the joint assembly. The boot positioning apparatus variably sets distances, from the left boot positioning mechanism, of the clamping mechanism and right boot positioning mechanism. A transfer-pallet-position adjusting apparatus includes an adjusting mechanism by which positions of first and second joint-assembly gripping mechanisms are adjusted in accordance with differences between current and target positions of the gripping mechanisms. A vertical position setting apparatus includes a plurality of stopper pieces, provided in correspondence with various possible types of constant velocity joint assembly, so as to allow an upper end of each joint assembly to be set to a uniform vertical position. A loader apparatus includes first and second loader gripping mechanisms mounted on a pivotable arm for gripping the constant velocity joint assembly, and a moving mechanism for moving the first and second loader gripping mechanisms by means of a servo motor and feed screws depending on a type of the joint assembly. Further, a second boot positioning apparatus includes two upper claws and two lower claws which are movable to grip therebetween any desired one of shafts having various different diameters.

12 Claims, 38 Drawing Sheets

FIG. 3
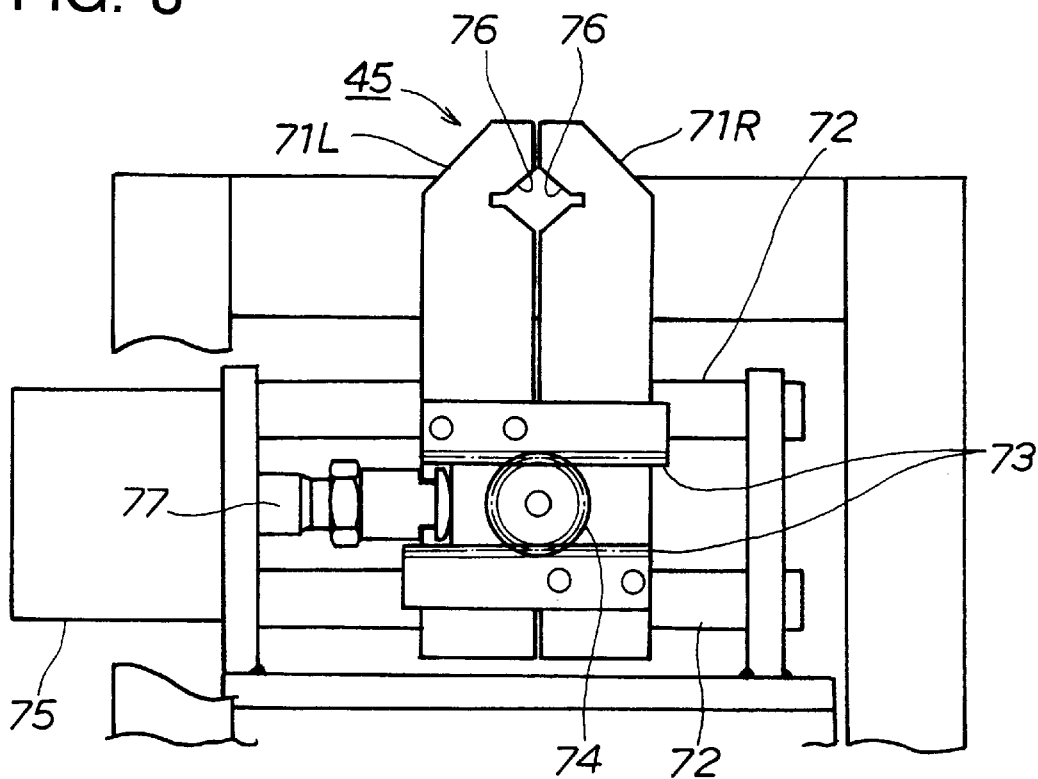
FIG. 4A
FIG. 4B
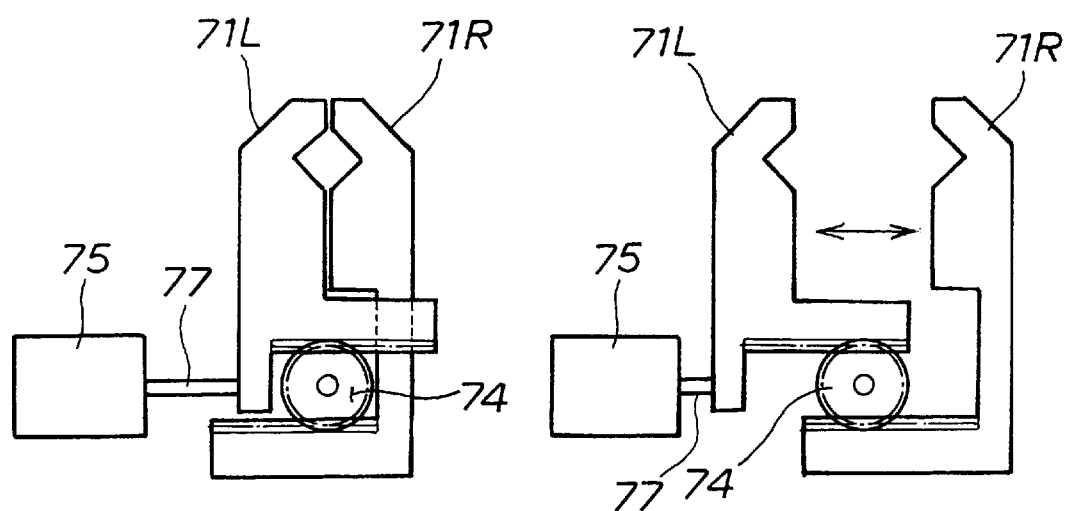

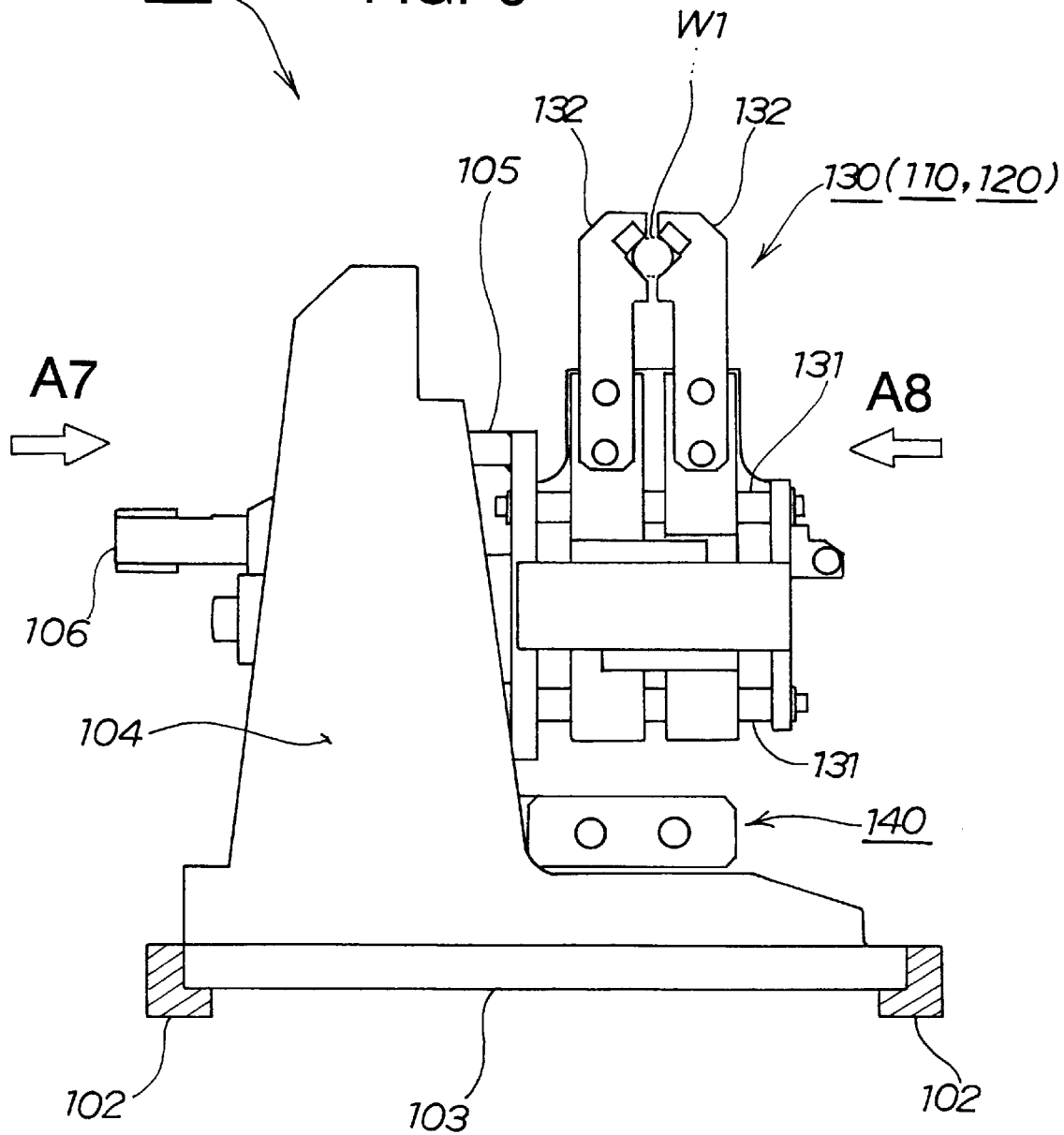

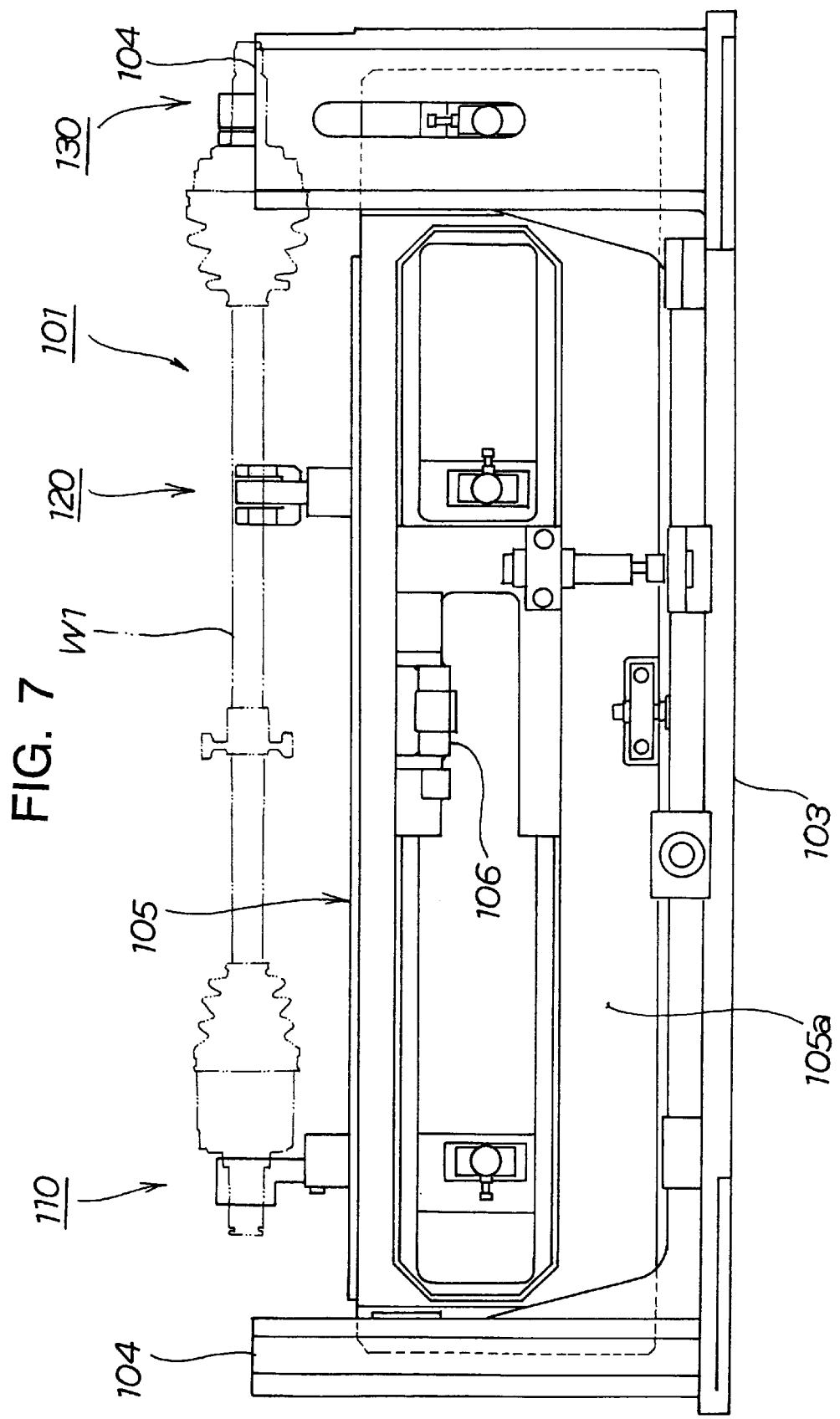

FIG.20

1 ON
0 OFF

| STOPPER PIECES | PROXIMITY SWITCHES 214 | PROXIMITY SWITCHES 215 | PROXIMITY SWITCHES 239 |
|---|---|---|---|
| 235a | 1 | 1 | 1 |
| 235b | 1 | 0 | 0 |
| 235c | 0 | 0 | 0 |
| 235d | 0 | 0 | 1 |
| 235e | 1 | 0 | 1 |
| 235f | 1 | 1 | 0 |
| 235g | 0 | 1 | 0 |
| 235h | 0 | 1 | 1 |

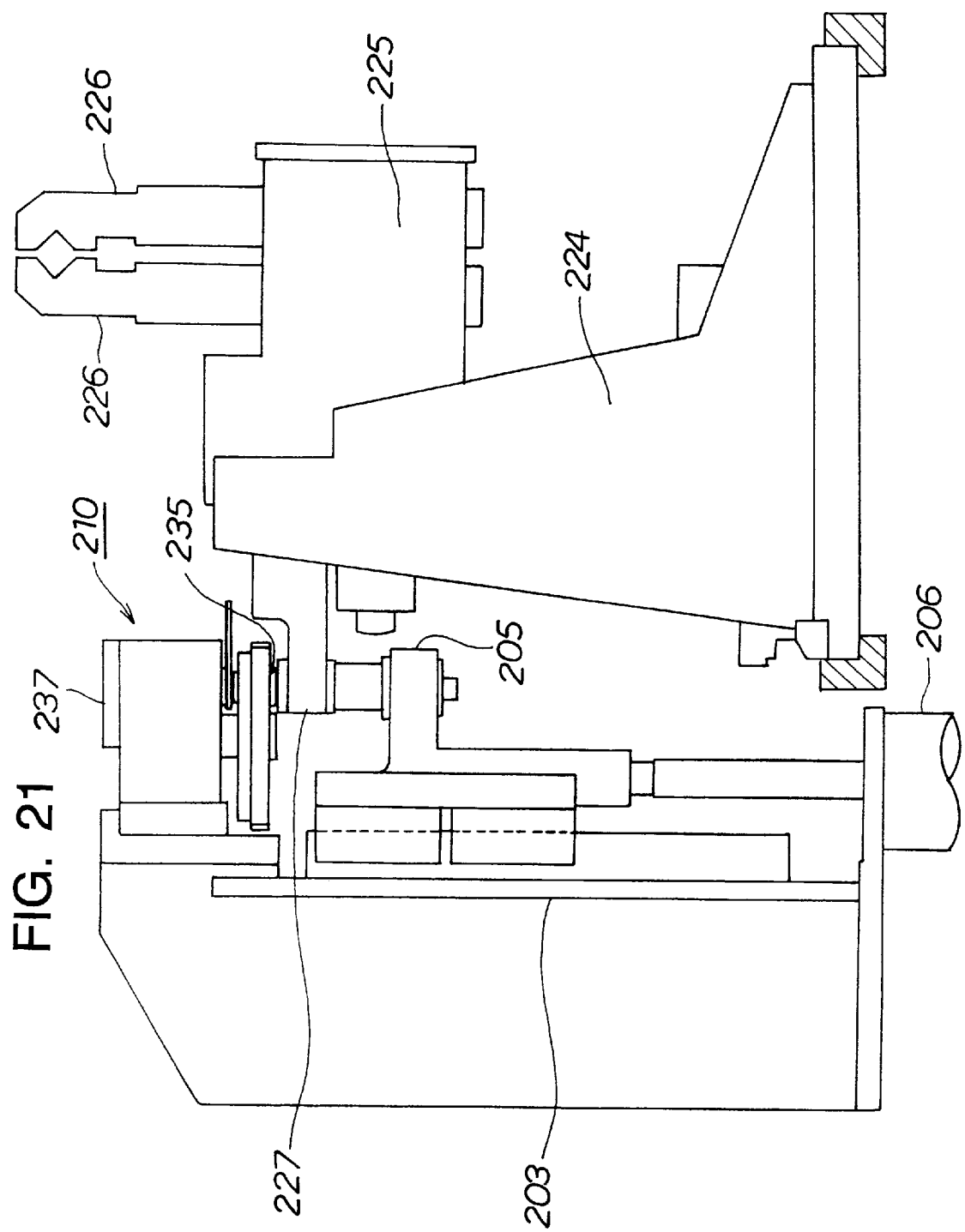

APPARATUS FOR FIXING BOOTS OF A CONSTANT VELOCITY JOINT ASSEMBLY AND APPARATUS FOR POSITIONING THE JOINT ASSEMBLY FOR USE THEREIN

BACKGROUND OF THE INVENTION

1. Field of the Invention

The present invention relates to a boot positioning apparatus for positioning protective boots at predetermined locations on a constant velocity joint assembly prior to winding thereon of fastening bands, and a transfer pallet adaptable to various types of constant velocity joint assembly. The present invention also relates to an apparatus for automatically setting a vertical position of a constant velocity joint assembly, a loader apparatus adaptable to various types of constant velocity joint assembly, and a boot positioning apparatus capable of positioning boots on drive shafts of various different diameters.

2. Description of the Related Art

In Japanese Patent Laid-open publication No. HEI-2-76649, the assignee of the present application discloses an invention entitled "Apparatus for fixedly attaching protective boot to a central drive shaft and drive shaft positioning apparatus for use therein", which will be outlined below with reference to FIG. 37 (corresponding to FIG. 15 of the Japanese publication).

Constant velocity joint assembly 500 shown in FIG. 37 comprises a relatively long, flexible central drive shaft 501, a Birfield constant-velocity ball joint 502 and tripod constant-velocity ball joint 520 coupled to both ends of the drive shaft 501, and a damper weight 515 mounted on a central portion of the drive shaft 501.

The Birfield constant-velocity ball joint 502 coupled to the one end of the central drive shaft 501 includes an outer ring 504 that is constructed of integrally-formed cup and shaft portions 505 and 506. In the outer ring 504, there are received a plurality of balls 507 forming a ball bearing, a retainer 508 and an inner ring 509. The ball joint 502 is a constant velocity universal joint which, even when some intersecting angle exists between the central drive shaft 501 and the shaft portion 506, can transmit torque by coupling one end of the shaft 501 with the inner ring 509 through male (external) and female (internal) splines (spline coupling). As well known in the art, the balls 507 has to be greased, and a protective boot 511 in the form of a bellows-like rubber cover is mounted to prevent leakage of the grease and entry of alien substances from the outside. Reference numerals 512 and 513 denote fastening bands that are firmly wound around the cup portion 505 and central drive shaft 501 to fixedly attach the axial ends of the boot 11 thereto. The damper weight 515 is also fixed to the central drive shaft 501 by means of a band 516.

The tripod constant-velocity ball joint 520 coupled to the other end of the central drive shaft 501 includes an outer ring 521 that is constructed of integrally-formed cup and shaft portions 522 and 523, and a Y-shaped member 525 having three leg portions (only one of the leg portions is shown in the figure). Three axial grooves 524 are formed in the inner surface of the outer ring 521, and a roller bearing 526 is provided around each of the leg portions and slidably fitted in a corresponding one of the grooves 524. In the ball joint 520, the central drive shaft 501 is spline-coupled at one end to the Y-shaped member 525 so as to permit axial movement of the outer ring 521 relative to the central drive shaft 501. Reference numeral 527 denotes a protective boot, and 528 and 529 denote fastening bands that are firmly wound around the cup portion 522 and central drive shaft 501 to fix the axial ends of the boot 527 thereto.

FIG. 38 is a view showing boot-fixing operations of the disclosed apparatus.

Arrow (1): Constant velocity joint assembly 500a placed on a workpiece seat 531 at the downstream end of a conveyor 530 is lifted by a first loader apparatus 532. At this stage, protective boots have just been attached incompletely or provisionally with no fastening bands wound thereon.

Arrow (2): The first loader apparatus 532 is moved laterally to transfer the constant velocity joint assembly 500a onto a positioning apparatus 533, where each of the boots is properly positioned at a predetermined location.

Arrow (3): The constant velocity joint assembly 500a with the properly positioned boots is lifted by a second loader apparatus 534.

Arrow (4): The constant velocity joint assembly 500a being lifted by the second loader apparatus 534 is horizontally turned by 90° and moved downstream by means of the loader apparatus 534 as shown by arrow (5).

Arrow (6): The constant velocity joint assembly 500a is lowered by means of the second loader apparatus 534 until it is placed on a transfer jig 535.

Arrow (7): The transfer jig 535 with the constant velocity joint assembly 500a placed thereon is moved a predetermined distance along a horizontal rail 536.

Arrow (8): The transfer jig 535 is positioned at a predetermined location in a first work station, and the constant velocity joint assembly 500a is then raised to a predetermined vertical position where a fastening band 512 is wound by a first band winding apparatus 537 on a large-diameter portion of the boot of the Birfield constant-velocity ball joint 502.

Then, in a similar manner, another fastening band 513 is wound by a second band winding apparatus 538 on a small-diameter portion of the second joint. After this, another fastening band 529 is wound by a third band winding apparatus 539 on a small-diameter portion of the first joint and still another band 528 is wound by a fourth band winding apparatus 540 on a large-diameter portion of the first joint. Further, still another band 516 is wound on the damper weight 515 by a fifth band winding apparatus 541.

After the winding of the band 516, the constant velocity joint assembly 500a is picked up from the transfer jig 535 by a third loader apparatus (not shown), and the thus-emptied transfer jig 535 is returned to the initial position by means of a return conveyor. The third loader apparatus holding the constant velocity joint assembly 500a is moved along a guide rail to transfer the joint assembly 500a onto a delivery conveyor. Namely, the constant velocity joint assembly 500a is unloaded from the transfer jig 535 and transferred downstream, while the emptied transfer jig 535 is returned upstream by means of the return conveyor.

As a result of the foregoing operational steps, the constant velocity joint assembly 500a with the boots provisionally attached in incomplete conditions becomes the constant velocity joint assembly 500 where each of the boots is fixed at the predetermined position with the fastening bands firmly wound at the axial opposite ends of the boot.

As disclosed in the 2-76649 publication, the positioning apparatus 533 has a right base plate slidably mounted on a base of the apparatus, a slide table slidably mounted on the base plate, and a first unit slidably mounted on the slide table. The right base plate has one more component part than a left base plate, which, in order to adapt to various types (especially, various different lengths) of constant velocity joint assembly 500 (500a), allows the right base plate to move in the leftward/rightward direction in response to a human operator manually operating a predetermined handle provided at the right end of the apparatus 533.

However, with the disclosed positioning apparatus 533, the predetermined handle needs to be adjusted by the human operator to deal with a change in the type of constant velocity joint assembly 500 (500a), which is very bothersome. Although the disclosed technique is suited for cases where the type of constant velocity joint assembly 500 (500a) to be constructed is not changed frequently, it can never be suitable for production of many types of constant velocity joint assembly. Further, because a first damper provided in the middle of the apparatus is mounted on the left slide table, the central drive shaft would be clamped at a portion away from its center, which would result in a difference in positioning accuracy of the left and right boots. In addition, the right base plate can be stopped only at a limited number of positions because only a limited number of proximity switches are provided to monitor a position of the right base table. Thus, in cases where it is desired to stop the right base table at many desired positions, many proximity switches need to be provided, so that the layout of the proximity switches would become very complicated and the switches would break down frequently.

The transfer jig 135 disclosed in the 2-76649 publication includes three dampers for gripping a right end, center and left end of a constant velocity joint assembly. Although the right and central dampers are slidably mounted on respective guide rails in order to handle or adapt to a plurality of types of constant velocity joint assembly, it is absolutely necessary for a human operator to manually loose a locking lever to permit the sliding movement of these dampers and then again tighten the locking lever. However, such manual operations of the locking lever are very cumbersome particularly in cases where the constant velocity joint assembly is frequently switched from one type to another. In other words, the disclosed technique is suited only for cases where the constant velocity joint assembly type is rarely switched and thus can not be suitable for production of multiple types of constant velocity joint assembly.

The 2-76649 publication also discloses an "apparatus for positioning a constant velocity joint assembly", which will be described below with reference to FIGS. 39A to 39C. FIG. 39A is a side view of a positioning apparatus 550, in which a lifter 551 raises an actuator arm 552 (denoted by a phantom line) to press the arm 552 against an upper stopper 553. FIG. 39B is a front view of the positioning apparatus 550, which shows that two stoppers 553 and 554 having different heights can be laterally moved by manually rotating a locking handle 555 in such a way that only one of the stoppers 553 or 554 is positioned immediately above the lifter 551. Further, FIG. 39C shows the actuator arm 552 raised by the lifter 551 and pressed against the upper stopper 553, and it is in this position that welding of the fastening bands are conducted.

However, to deal with every change in the type of constant velocity joint assembly 500 (500a), the stoppers 553 and 554 must be repositioned by manually rotating the locking handle 555 in the positioning apparatus 550, which is very bothersome. Although the disclosed technique is suited for cases where only two types of constant velocity joint assembly 500 (500a) are handled and switching between the types does not frequently take place, it can never be suitable for production of multiple types of constant velocity joint assembly. If the number of such stoppers is increased, the entire size of the apparatus will unavoidably become greater.

Further, as disclosed in the 2-76649 publication, the second loader apparatus includes three dampers for gripping the constant velocity joint assembly, and these dampers are adjustable in position. The first and third loader apparatuses are constructed in the same way as the second loader apparatus. The positional adjustment in the loader apparatuses has to be conducted manually, and thus these loader apparatus are suited only for such cases where the joint assembly type switching does not take place often and are never suited for production of multiple types of constant velocity joint assembly.

The same assignee also proposed, in Japanese Patent Laid-open Publication No. HEI-4-201132, an apparatus which is designed to accurately position the ends of the boots at the ends of the central drive shaft as outlined in FIG. 40. In FIG. 40, the boot positioning apparatus 600 includes a pair of opposed leg portions 602 extending from a slider 601, on each of which is swingably mounted a pressing member 603. Each of the pressing members 603 is normally biased via a coiled tension spring 604 to an open position. FIG. 40 shows the apparatus 600 with the pressing members 603 lightly gripping a shaft 605. The inner gripping portions of the pressing members 603 must have a same curvature as the outer peripheral curvature of the shaft 605. However, today, situations often arise where the same boot positioning apparatus 600 has to handle a variety of shafts 605 of different diameters. Every time the workpiece to be handled is changed to another one of different outer peripheral curvature, the pressing members 603 must be replaced with others having corresponding curvature. Thus, many pressing members of different sizes must be produced by lots for each size and stocked for subsequent use. As a result, the boot positioning apparatus 600 required a substantial time and steps to adapt to many types of workpiece or constant velocity joint assembly and thus can not properly deal with production of multiple types of constant velocity joint assembly.

SUMMARY OF THE INVENTION

A boot positioning apparatus according to the present invention comprises a left boot positioning mechanism, a central drive shaft clamping mechanism and a right boot positioning mechanism, and the central drive shaft clamping mechanism and right boot positioning mechanism are constructed in such a way that their distances from the left boot positioning mechanism can be varied by the respective motor-driven feed screw mechanism. When the workpiece, i.e., constant velocity joint assembly, is to be changed to one of another type having a different axial length, the individual motors are driven, on the basis of detection of the different axial length, to change the respective positions of the central drive shaft clamping mechanism and right boot positioning mechanism. With such an arrangement, necessary adjustments for the other-type constant velocity joint assembly are automatically done within a short time, so that enhanced productivity is achieved. Further, because the feed screw mechanism is employed, the current positions of the central drive shaft clamping mechanism and right boot positioning mechanism can be identified with high accuracy, and thus, there is no need to provide position-detecting limit switches (proximity switches) as in the prior art. This can greatly simplify the structure of the apparatus and effectively avoid breakdown of the apparatus.

The feed screw mechanism includes a first feed screw for moving the central drive shaft clamping mechanism and a second feed screw for moving the right boot positioning mechanism, and the first and second feed screws are ball screws each having a nut, a screw shaft and balls placed between the nut and the shaft. The rolling friction of the ball screws greatly reduces screwing resistance and thereby achieves much higher screwing efficiency. As a result, the ball screws reduces load on a motor rotating the ball screws and hence eliminates the need for a high-power motor, which would result in greatly reduced power consumption.

The present invention also includes an apparatus for adjusting a position of a constant-velocity-joint-assembly transfer pallet, which includes a first gripping mechanism for supporting one end of a constant velocity joint assembly, a second gripping mechanism for supporting a central portion of the constant velocity joint assembly, and a third gripping mechanism for supporting another end of the constant velocity joint assembly. The apparatus comprises a first scaling cylinder for monitoring a position of said first gripping mechanism, a second scaling cylinder for monitoring a position of the second gripping mechanism, and an adjusting mechanism for adjusting positions of the first and second gripping mechanisms in accordance with differences between current positions and target positions of the first and second gripping mechanisms. The first and second scaling cylinders monitor respective positions of the first and second gripping mechanisms even during positional adjustment thereof by the adjusting mechanism. The adjusting mechanism is provided separately from the transfer pallet, so that the transfer pallet can be properly adjusted by the adjusting mechanism without resorting to human labor.

The transfer pallet of the present invention includes first and second feed screws for moving and adjusting positions of the first and second gripping mechanisms, respectively, and a moving mechanism for rotating the feed screws. The moving mechanism includes a rotating mechanism that rotates the first and second feed screws via a flexible coupling provided at one end of each of the feed screws. The rotating mechanism includes male and female spline members for rotating the feed screws only when the moving mechanism is to adjust the positions of the first and second gripping mechanisms; the male and female spline members function as brakes when the moving mechanism is to not adjust the positions of the first and second gripping mechanisms, and the brakes prevent the first and second gripping mechanisms from being displaced during their transfer by the pallet.

The present invention also provides an apparatus for setting a vertical position of a constant velocity joint assembly, which includes a stopper mechanism for setting an upper limit position of an actuator arm of an joint assembly supporting jig frame depending on a type of the constant velocity joint assembly, in order to allow every possible type of constant velocity joint assembly to undergo a welding operation always at an uniform vertical position. The stopper mechanism is driven by a motor. Thus, the vertical position of every type of constant velocity joint assembly can be promptly changed without resorting to human labor. The motor may be an indexing motor or a servo motor provided with a rotational angle indexing means such as a rotary encoder; this can greatly reduce the number of proximity switches to thereby make the apparatus more compact.

The stopper mechanism includes a plurality of stopper pieces fixedly mounted on a disk-shaped stopper plate rotatable via the indexing motor in such a manner that the number of the stopper pieces can be readily increased, so that the number of types of constant velocity joint assembly that can be handled by the present invention can be readily increased. The stopper mechanism includes a pair of position detecting pieces fixed to a shaft of the indexing motor, proximity switches for generating ON/OFF signals in response to recessed and raised portions of the position detecting pieces, a plurality of projections formed on the stopper plate, and another proximity switch for generating ON/OFF signals in response to current locations of the projections relative to the other proximity switch. The stopper pieces are identifiable from each other on the basis of combinations of the ON/OFF signals.

The present invention also provides a constant-velocity-joint-assembly loading apparatus, which comprises a slider mounted on a horizontal guide rail for sliding movement therealong, a cylinder unit connected vertically to the the slider, a pivotable beam connected via a rotary coupling to a piston rod of the cylinder unit in such a manner that the beam is horizontally pivotable, first, second and third gripping mechanisms, mounted on the pivotable beam, for gripping one end, central portion and another end, respectively, of a constant velocity joint assembly. The first and second gripping mechanisms are movable via servo motors and feed screws. With the above-described arrangement that the servo motor is driven differently depending on a type or length of a constant velocity joint assembly and the first and second gripping mechanisms are moved by the servo motor rotating the corresponding feed screws, the present invention permits remote control, automated operation and prompt adjustments for every type of constant velocity joint assembly without resorting to human labor.

The present invention also provides a boot positioning apparatus, which includes pressing members having left and right upper claws and lower claws which are freely openable and closeable depending on a diameter of a shaft. The boot positioning apparatus of the present invention can perform universal boot positioning functions for shafts of many different diameters. This eliminates the need for changing pressing members as in the prior art and thus permit production of various types of constant velocity joint assembly.

BRIEF DESCRIPTION OF THE DRAWINGS

For better understanding of the present invention, various preferred embodiments will be described hereinbelow with reference to the accompanying drawings, in which:

FIG. 3 is a view of a right clamping claw as seen in the direction of arrow A3;

FIGS. 4A and 4B are views explanatory of operation of the right clamping claw shown in FIG. 3;

FIG. 6 is a front view of a constant-velocity-joint-assembly transfer pallet according to an embodiment of the present invention;

FIG. 7 is a view as seen in the direction of arrow A7 of FIG. 6, showing the left side of the constant-velocity-joint-assembly transfer pallet;

FIG. 20 is a table showing various combinations of ON/OFF states of three proximity switches which are used to identify stopper pieces;

FIG. 21 is a view showing functional relation between the stopper mechanism and an actuating arm of the transfer jig;

DETAILED DESCRIPTION OF THE PREFERRED EMBODIMENTS

Figure 1:
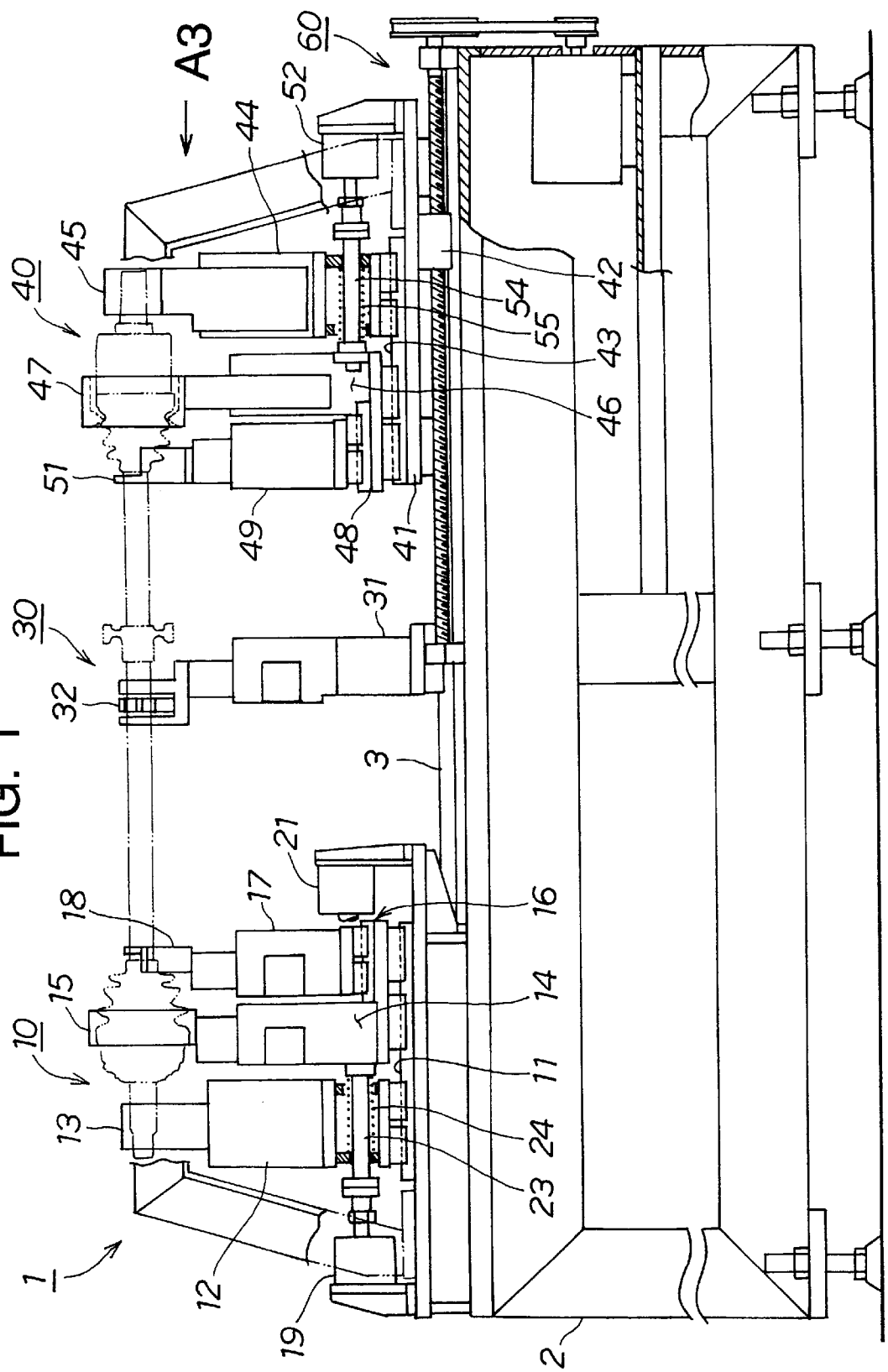
FIG. 1 is a front view of an apparatus for positioning protective boots on a constant velocity joint assembly according to an embodiment of the present invention.

FIG. 1 shows a boot positioning apparatus 1 according to an embodiment of the present invention, which comprises a base 2, left and right boot positioning mechanisms 10 and 40 mounted on the left and right of the base 2, a central drive shaft clamping mechanism 30 mounted on the base 2 between the left and right positioning mechanisms 10 and 40, and a feed screw mechanism 60 for moving the right boot positioning mechanism 40 and clamping mechanism 30 along a horizontal rail 3.

The left boot positioning mechanism 10 includes first and second left sliders 12 and 14 movable along a horizontal rail 11, a left clamping claw 13 mounted on the top of the first left slider 12, and pressing members 15 mounted on the top of the second left slider 12 for pressing a larger-diameter portion of a left protective boot. The left boot positioning mechanism 10 also includes a third left slider 17 movable along a horizontal rail 16 on the second left slider 14, pressing members 18 mounted on the top of the third left slider 17 for pressing a small-diameter portion of the left boot, a first left cylinder 19 for moving the first and second left sliders 12 and 14, and a second left cylinder 21 for moving the third slider 17.

As the second left slider 14 is moved leftward via a rod 23 by the first left cylinder 19, the first left slider 12 is also moved leftward via a spring 24. Although the movement of the first left slider 12 is limited halfway by a stopper (not shown), the second left slider 14 continues to move leftward. The third left slider 17 moves leftward independently of the first and second left sliders 12 and 14. The central drive shaft clamping mechanism 30 includes a central slider 31, a central drive shaft clamping claw 32, and a nut 33 (as will be later described in relation to FIG. 2).

The right boot positioning mechanism 40 includes a base slider 41 movable along a horizontal rail 3, a nut 42 secured to the underside of the base slider 41, first and second right sliders 44 and 46 movable along a horizontal rail 43 formed on the base slider 41, a right clamping claw 45 mounted on the top of the first right slider 44, and a pressing member 47 mounted on the top of the second right slider 46 for pressing a larger-diameter portion of a protective right boot. The right boot positioning mechanism 40 also includes a third right slider 49 movable along a horizontal rail 48 on the second left slider 46, a pressing member 51 mounted on the top of the third right slider 49 for pressing a small-diameter portion of the right boot, a first right cylinder 52 for moving the first and second right sliders 44 and 46, and a second left cylinder (not shown) for moving the third slider 49. The right boot positioning mechanism 40 further includes a rod 54 and a spring 55.

Detailed operation of the right boot positioning mechanism 40 is not described here because it operates in substantially the same manner as the above-mentioned left boot positioning mechanism 10 except that the operational directions of some of the individual components are horizontally opposite to those in the left boot positioning mechanism 10 and that the individual components are horizontally movable by means of the base slider 41.

Figure 2:
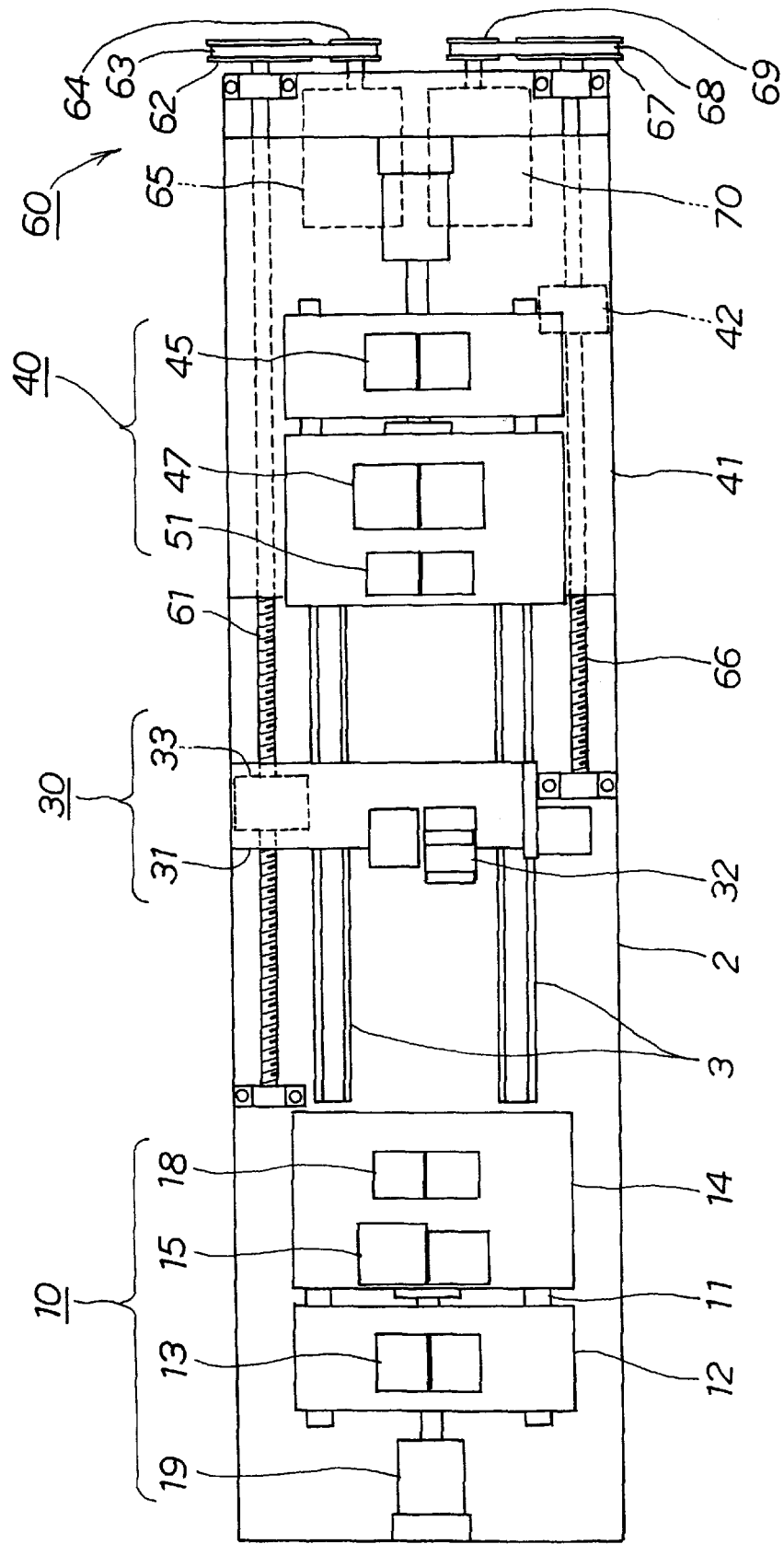
FIG. 2 is a plan view of the boot positioning apparatus of FIG. 1.

As shown in FIG. 2, the feed screw mechanism 60 includes a sufficiently long first feed screw 61 on which the nut 33 tis threaded, and a first synchronous motor 65 for rotating the feed screw 61 via a pulley 64, belt 63 and pulley 62. The feed screw mechanism 60 also includes a sufficiently long second feed screw 66 on which the nut 42 is threaded, and a second synchronous motor 70 for rotating the feed screw 66 via a pulley 69, belt 68 and pulley 67. The central slider 31 is accurately movable in either direction (leftward/rightward directions) along the first feed screw 61 by the first synchronous motor 65 rotating the feed screw 61 in either of two directions. Similarly, the base slider 41 is accurately movable in either direction (leftward/rightward directions) along the second feed screw 66 by the second synchronous motor 70 rotating the feed screw 66 in either of two directions.

FIG. 3 is a plan view showing in detail the right clamping claw 45 of FIG. 1. As shown, the right clamping claw 45 includes a pair of left and right claws 71L and 71R each having a V-shaped recess 76, a pair of guide rods 72 for guiding the respective claws 71L and 71R, a pair of racks 73 secured to the respective claws 71L and 71R, and an idler pinion 74 engaging with the racks 73 and rotatably supported by the base via a bracket (not shown). The right clamping claw 45 also includes a clamping cylinder 75 having a piston rod 77 engaging with the left claw 71L.

FIGS. 4A and 4B are views explanatory of operation of the right clamping claw 45, of which FIG. 4A schematically shows the left and right claws 71L and 71R in a closed position, i.e., clamping position. To move the claws 71L and 71R to an open or unclamping position, the left claw 71L is pulled away from the right claw 71R by the piston rod of the clamping cylinder 75, so that the right claw member 71R is moved away from the left claw 71L via the idler pinion 74. In this way, the claws 71L and 71R are placed in the unclamping position as shown in FIG. 4B.

The left clamping claw 13, central drive shaft clamping claw 32, left and right large-diameter-portion pressing members 15 and 47 and left and right small-diameter-portion pressing members 18 and 51 operate in generally the same manner as the above-mentioned right clamping claw 45, and hence their operation is not described here to avoid unnecessary duplication.

A description will be given hereinbelow about overall operation of the boot positioning apparatus 1 of FIG. 1.

Figure 5A:
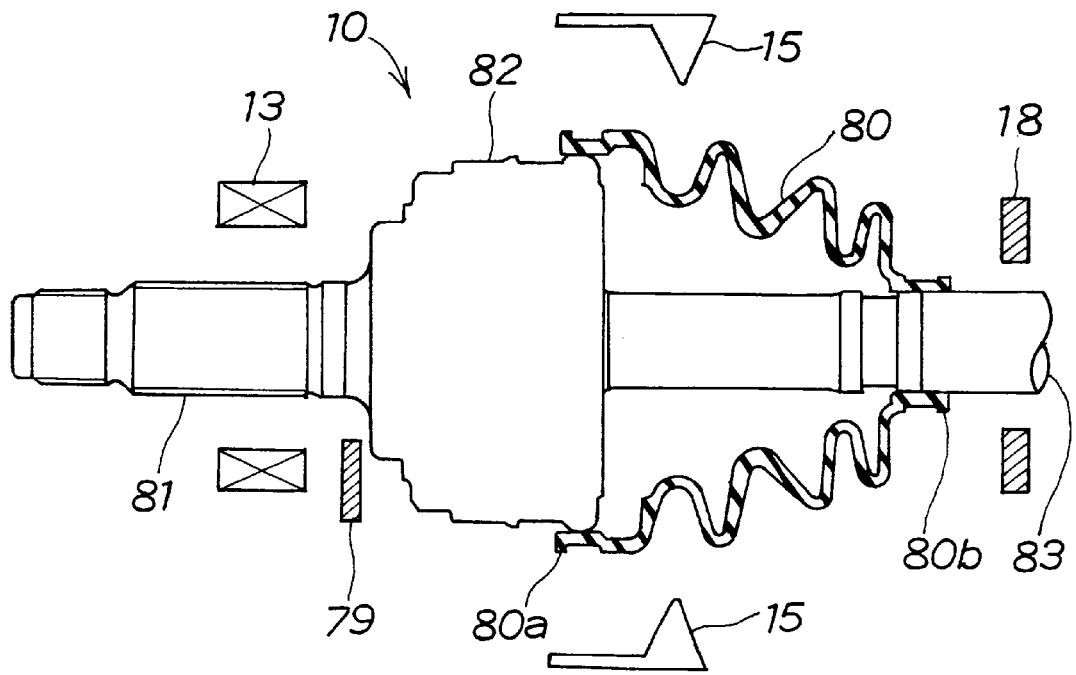
FIGS. 5A to 5D are views explanatory of operation of a left boot positioning mechanism in the apparatus of FIG. 1.

FIGS. 5A to 5D are views explanatory of operation of the left boot positioning mechanism 10 in the apparatus 1, of which FIG. 5A shows a case where the constant velocity joint assembly with a protective boot 80 provisionally attached thereto at a previous step is introduced and set in the boot positioning apparatus 1 of the present invention. Reference numeral 79 is a left stopper for limiting leftward movement of a cup portion 82. As seen from FIG. 1, the left clamping claw 13, left large-diameter-portion pressing members 15 and left small-diameter-portion pressing members 18 are placed on the first left slider 12, second left slider 14 and third left slider 17, respectively, for sliding movements in the horizontal (leftward/rightward) direction.

Figure 5B:
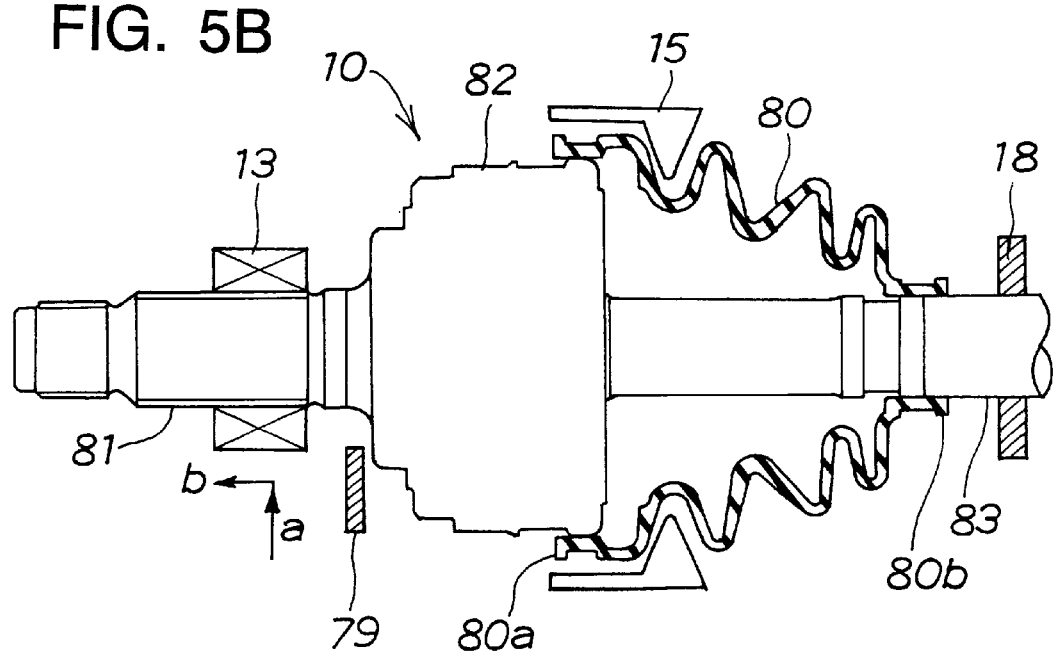

As shown in FIG. 5B, first, a shaft 81 is clamped by the left clamping claw 13 (arrow "a"), and then, the clamping claw 13 is pulled leftward as denoted by arrow "b" until the cup portion 82 abuts against the left stopper 79. During the time when the boot positioning mechanism 10 is moved from the position of FIG. 5A to the position of FIG. 5B, the left large-diameter-portion pressing members 15 and left small-diameter-portion pressing members 18 are both brought into pressing positions. In the pressing position, however, the small-diameter-portion pressing members 18 loosely sandwich a central drive shaft 83 of the drive shaft with slight clearance formed therebetween.

Figure 5C:
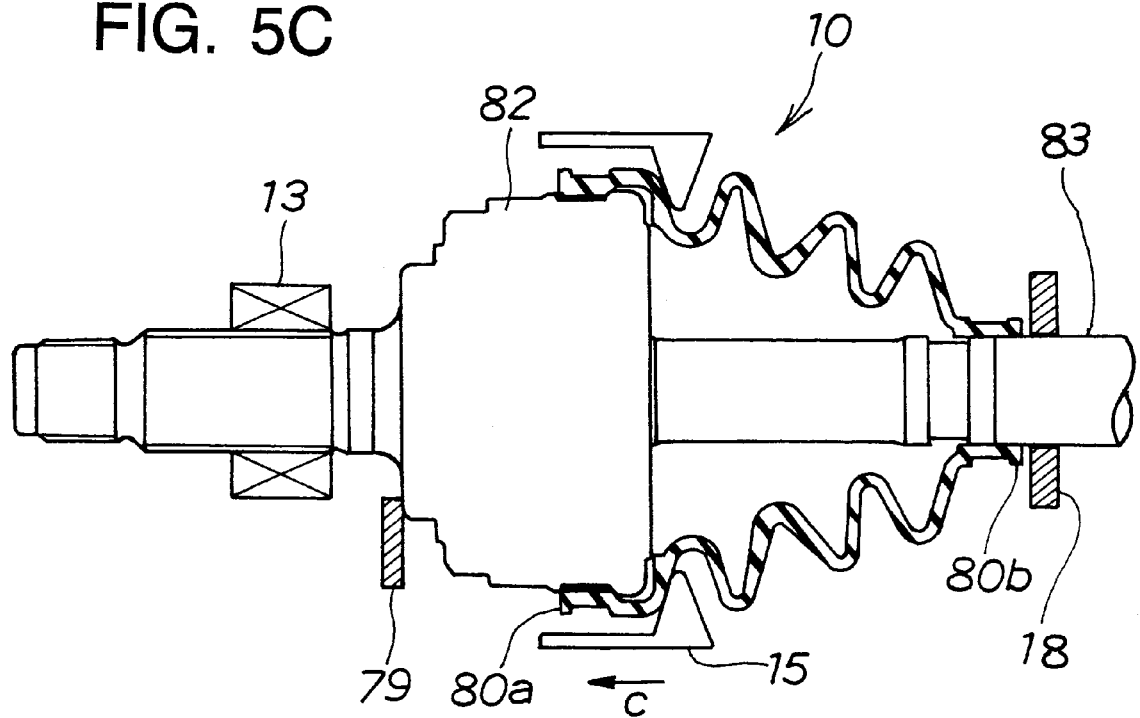

Then, as shown in FIG. 5C, the left large-diameter-portion pressing members 15 are moved leftward as denoted by arrow "c" so as to position the boot's large diameter portion 80a on a predetermined outer peripheral region of the cup portion 82. Also, as shown in FIG. 5D, the left small-diameter-portion pressing members 18 are moved leftward as denoted by arrow "d" so as to position the boot's small diameter portion 80b on a predetermined outer peripheral region of the central drive shaft 83.

Although not specifically described here, the right boot positioning mechanism 40 operates concurrently with the left boot positioning mechanism 10. Because the central drive shaft 83 is clamped by the central drive shaft clamping claws 32 (see FIG. 1), the above-mentioned operations cause only the left and right joints (including the cup portions 82) to move until they abut against the stoppers 79.

Figure 5D:
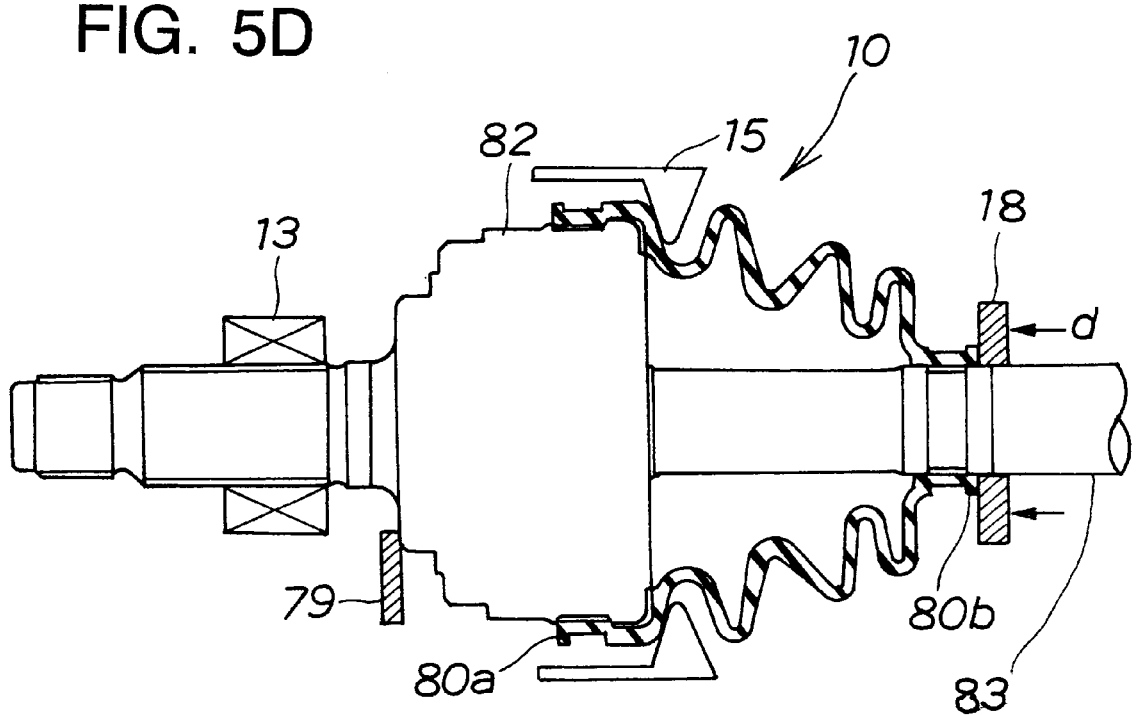

After the operations of FIG. 5D, a predetermined fastening band is wound on the boot, as earlier described in relation to the prior art.

When the joint assembly is to be changed to one of another type, it is only necessary that the first feed screw 61 be rotated to change the position of the central drive shaft clamping mechanism 30 and the second feed screw 66 be rotated to change the position of the right boot positioning mechanism 40.

Because the synchronous motors 65 and 70 can accurately rotate the respective feed screws 61 and 66 on the basis of control signals supplied from a controller (not shown), the required positional changes can be effected automatically. Therefore, the present invention can effectively save human labor and enhance productivity in manufacturing constant velocity joint assemblies. According to the embodiment, the synchronous motors 65 and 70 may be servo motors, or motors provided with rotary encoders. Further, the feed screws 61 and 66 may be ball screws rather than the ones directly engaging with normal nuts; the ball screws afford higher accuracy and efficiency.

In the above-described boot positioning apparatus comprising the left boot positioning mechanism, central drive shaft clamping mechanism and right boot positioning mechanism, the central drive shaft clamping mechanism and right boot positioning mechanism are constructed in such a way that their distances from the left boot positioning mechanism can be varied by the respective motor-driven feed screw mechanism. When the workpiece, i.e., constant velocity joint assembly, is to be changed to one of another type having a different axial length, the individual motors are driven, on the basis of detection of the different axial length, so as to change or adjust the respective positions of the central drive shaft clamping mechanism and right boot positioning mechanism.

With such an arrangement, necessary adjustments for the other-type constant velocity joint assembly are automatically effected within a short time, achieving enhanced productivity. Further, because the feed screw mechanism is employed, the current positions of the central drive shaft clamping mechanism and right boot positioning mechanism can be identified with high accuracy, and thus, there is no need to provide position-detecting limit switches (proximity switches) as in the prior art. This can greatly simplify the structure of the apparatus and effectively avoid a breakdown of the apparatus.

Further, because the feed screw mechanism 60 in the boot positioning apparatus includes the first feed screw for moving the central drive shaft clamping mechanism and the second feed screw for moving the right boot positioning mechanism, and the first and second feed screws are ball screws each having a nut, a screw shaft and balls placed between the nut and the shaft. The rolling friction of the ball screws greatly reduces screwing resistance and thereby achieves much higher screwing efficiency. As a result, the ball screws greatly reduces load on a motor rotating the ball screws and hence eliminates the need for a high-power motor, which would advantageously result in greatly reduced power consumption.

Next, a description will be made about an embodiment of a transfer pallet for moving a constant velocity joint assembly. FIG. 6 is a front view of the joint assembly transfer pallet, which generally corresponds to the "transfer jig" described earlier in relation to the prior art.

The transfer pallet 101 shown in FIG. 6 is a transfer jig movable along horizontal rails 102 in a direction perpendicular to the sheet of the drawing. The transfer pallet 101 includes a slide base 103, a pair of support plates 104 (only one support plate 104 is shown in FIG. 6 because the other support plate 104 is hidden behind it in the figure) mounted upright on the slide base 103, and a jig frame 105 vertically movable between the support plates 104. The transfer pallet 101 includes three gripping mechanisms 110, 120 and 130 (only one gripping mechanism 130 is shown in FIG. 6 because the other gripping mechanisms 120 and 110 are hidden behind it in the figure) mounted upright on the jig frame 105, and a moving mechanism 140 for adjusting individual positions of the gripping mechanisms 110, 120 and 130 in the direction perpendicular to the sheet of the drawing. Reference numeral 106 denotes a vertically movable arm protruding from the jig frame 105.

The gripping mechanism 130 includes a pair of left and right gripping claws 132 horizontally movably mounted on upper and lower guide rods 131 which are secured to the jig frame 105. The gripping claws 132 cooperate to resiliently grip therebetween a constant velocity joint assembly W1 with spring force.

The transfer pallet 101 will be described more fully in the following paragraphs.

FIG. 7 is a view as seen in the direction of arrow A7 of FIG. 6, showing the left side of the joint assembly transfer pallet 101. In the transfer pallet 101, the first, second and third gripping mechanisms 110, 120 and 130 are arranged in order of mentioning in the left-to-right direction and attached to the jig frame 105, which is in turn attached at its opposite ends to the opposed upright support plates 104 for vertical sliding movement therealong. These three gripping mechanisms 110, 120 and 130 operate to grip one end, central portion and the other end, respectively, of the constant velocity joint assembly W1.

In FIG. 7, the vertically movable arm 106 protrudes from a relatively large back plate 105a of the jig frame 105 toward a viewer of the drawing. Thus, as the vertically movable arm 106 is moved upward by suitable drive means, the jig frame 105 behind the arm 106 and hence the first, second and third gripping mechanisms 110, 120 and 130 attached thereto are caused to go up together.

Figure 8:
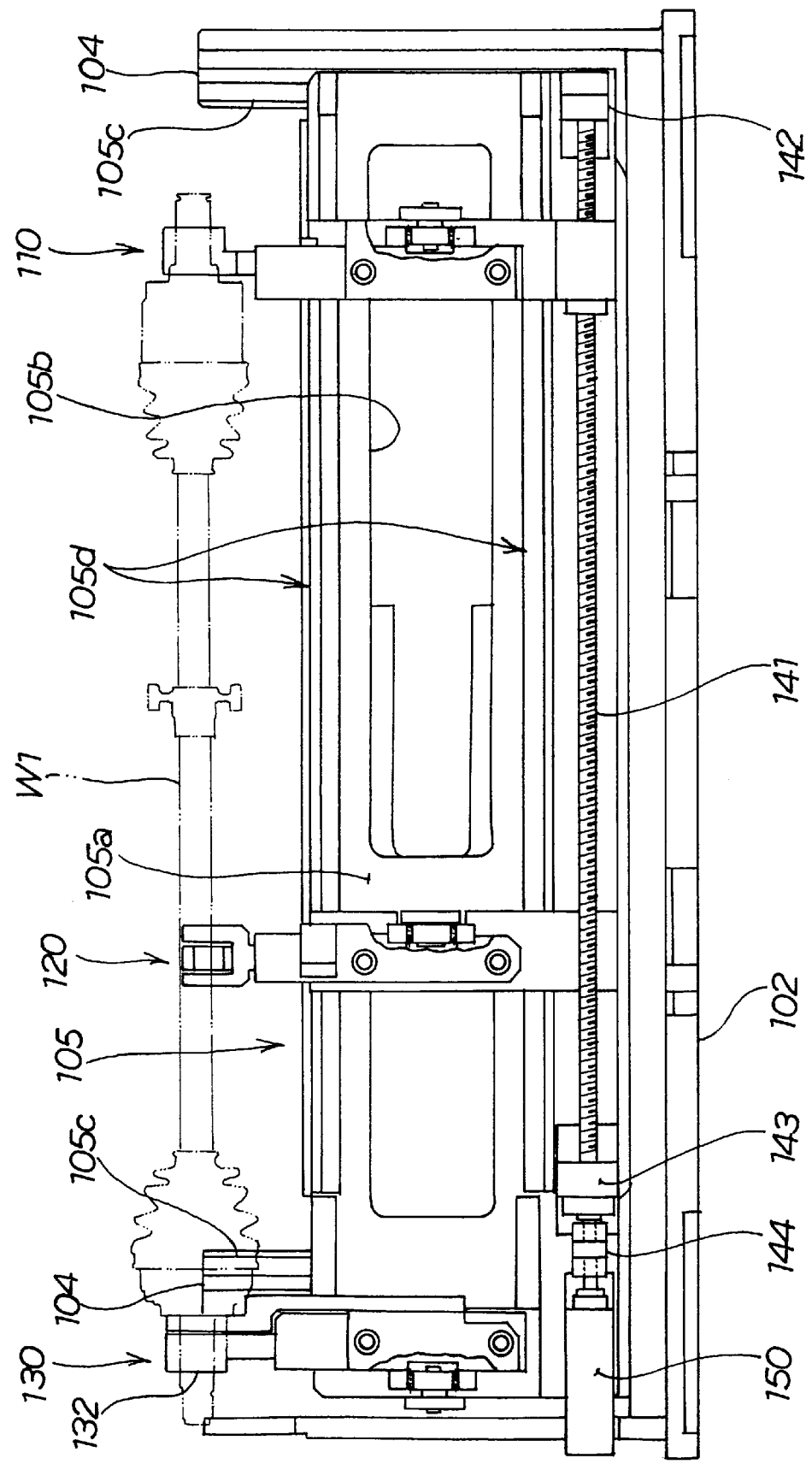
FIG. 8 is a view as seen in the direction of arrow A8 of FIG. 6, showing the right side of the joint assembly transfer pallet.

FIG. 8 is a view as seen in the direction of arrow A8 of FIG. 6, showing the right side of the joint assembly transfer pallet 101. The back plate 105a of the jig frame 105 is vertically movable along the left and right support plates 104 by means of left and right vertical rails 105c. The first and second gripping mechanisms 110 and 120 are also horizontally movable along the jig frame 105 by means of upper and lower horizontal rails 105d, while the third gripping mechanism 130 is fixedly attached to the jig frame 105 in such a manner to not move in the horizontal direction. Reference numeral 105b denotes a recess formed to reduce the weight of the entire back plate 105a.

Figure 9:
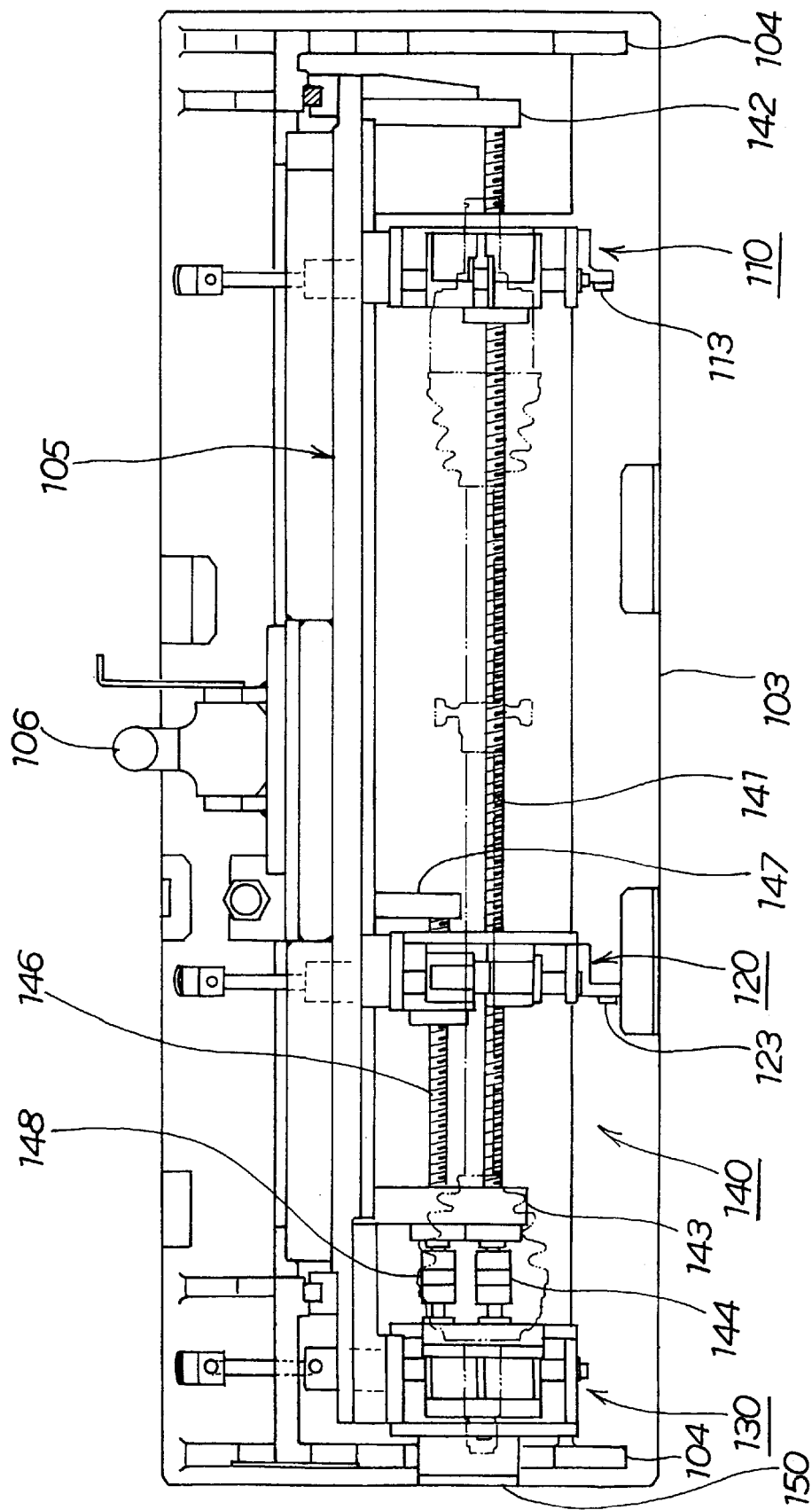
FIG. 9 is a plan view of the transfer pallet shown in FIG. 8.

FIG. 9 is a plan view of the transfer pallet 101, and a description will be made below about the moving mechanism 140 provided below the jig frame 105 with reference to FIG. 9. The moving mechanism 140 includes a relatively long first feed screw 141 for moving the first gripping mechanism 110, and a relatively short second feed screw 146 for moving the second gripping mechanism 120. The moving mechanism 140 also includes a screw support 143 for supporting one end of the first and second feed screws 141 and 146, a screw support 142 for supporting the other end of the first feed screw 141, and a screw support 147 for supporting the other end of the second feed screw 146. The moving mechanism 140 further includes a flexible coupling 144 mounted on one end of the first feed screw 141, a flexible coupling 148 mounted on one end of the second feed screw 146, and a rotating mechanism 150 for rotating the first and second feed screws 141 and 146. A scale bearer 113 is provided on the shoulder of the first gripping mechanism 110, and a scale bearer 123 is provided on the shoulder of the second gripping mechanism 120.

Figure 10:
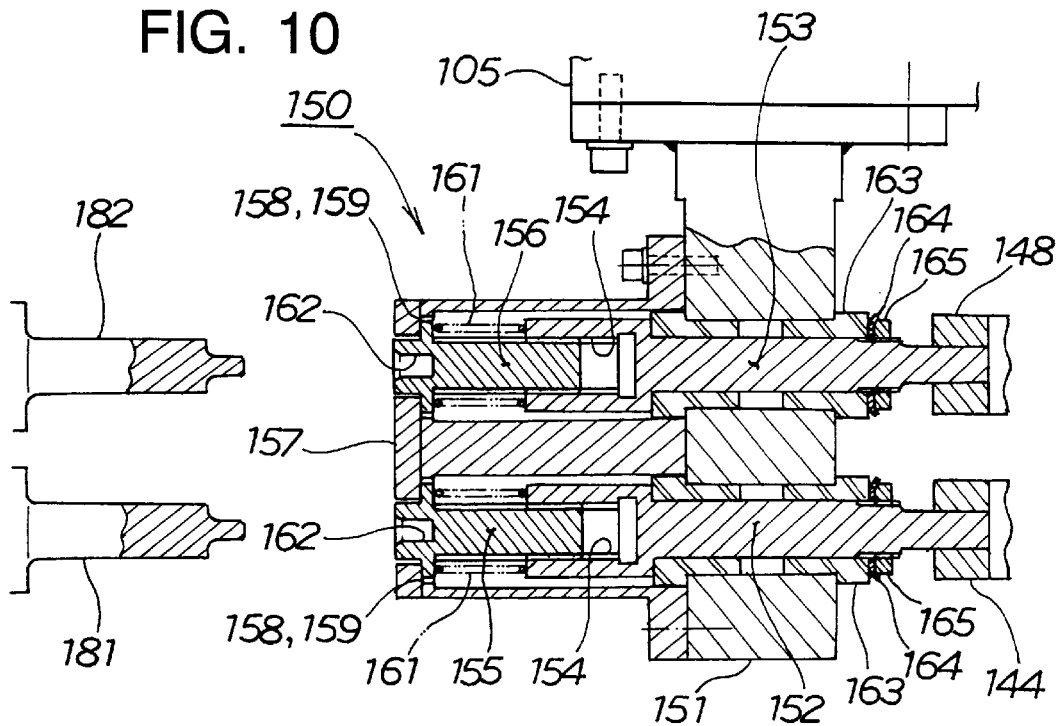
FIG. 10 is a sectional plan view of a rotating mechanism in a moving mechanism.

FIG. 10 is a sectional plan view of the rotating mechanism 150 of the moving mechanism 140. The rotating mechanism 150 includes first and second relay rods 152 and 153 extending through a bracket 151 that protrudes from the jig frame 105 and has spline grooves (female splines) 154 formed in respective primary ends of the first and second relay rods 152 and 153. The rotating mechanism 150 also includes first and second rotational rods 155 and 156 that are fitted in the grooves 154 for axial sliding movement therealong, and a case 157 receiving therein these rotational rods 155 and 156 and the like. When the rotational rods 155 and 156 are not to be rotated, spline ridges (male splines) 158 formed on respective flanges of the rotational rods 155 and 156 mate with corresponding spline grooves 159 formed in the case 157, so as to brake the rods 155 and 156 against rotation. Reference numeral 161 denotes a spring provided for the braking purposes, 162 a minus (−) groove, 163 a bearing, 164 a rotation-preventing washer, 165 a locking nut, and 144 and 148 the above-mentioned flexible couplings.

Figure 11:
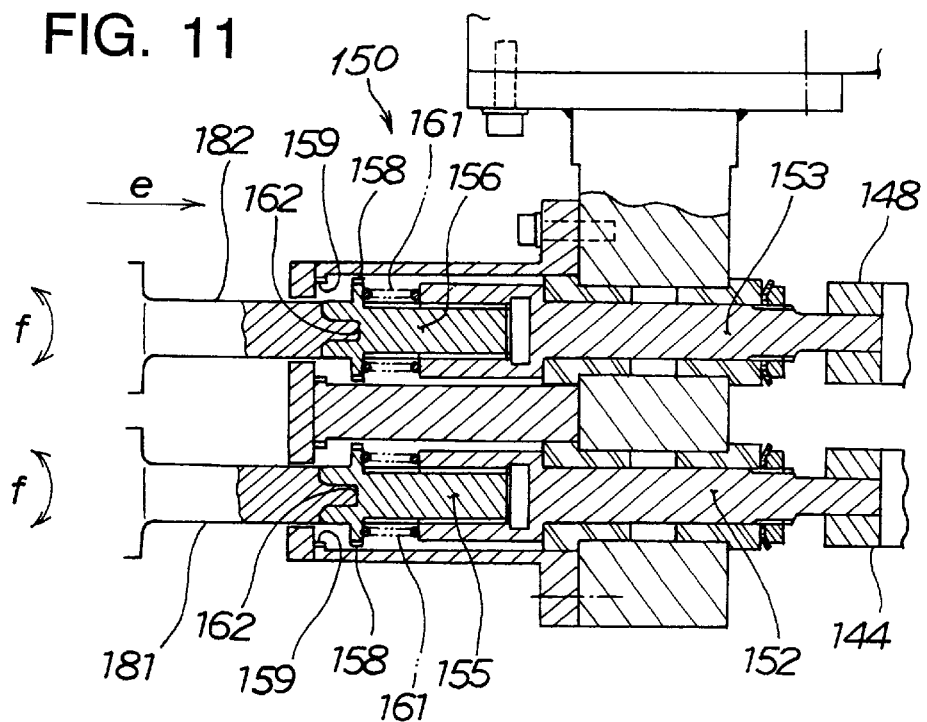
FIG. 11 is a view explanatory of the rotating mechanism shown in FIG. 10.

Now describing operation of the rotating mechanism 150 with reference to FIG. 11, first and second runner shafts 181 and 182 are pushed as denoted by arrow "e" so that the tip ends of the shafts 181 and 182 are brought into engagement with the corresponding minus grooves 162. Thus, the spline ridges 158 on the rotational rods 155 and 156 are pushed out of the mating engagement with the spline grooves 159 in the case 157, and now the rotational rods 155 and 156 are each in a rotatable condition. Then, by rotating the first and second runner shafts 181 and 182 in either of the directions denoted by two-way arrow "f", the above-mentioned first and second screws 141 and 146 (FIG. 9) are rotated via the rotational rods 155 and 156, relay rods 152 and 153 and flexible couplings 141 and 146.

Figure 12:
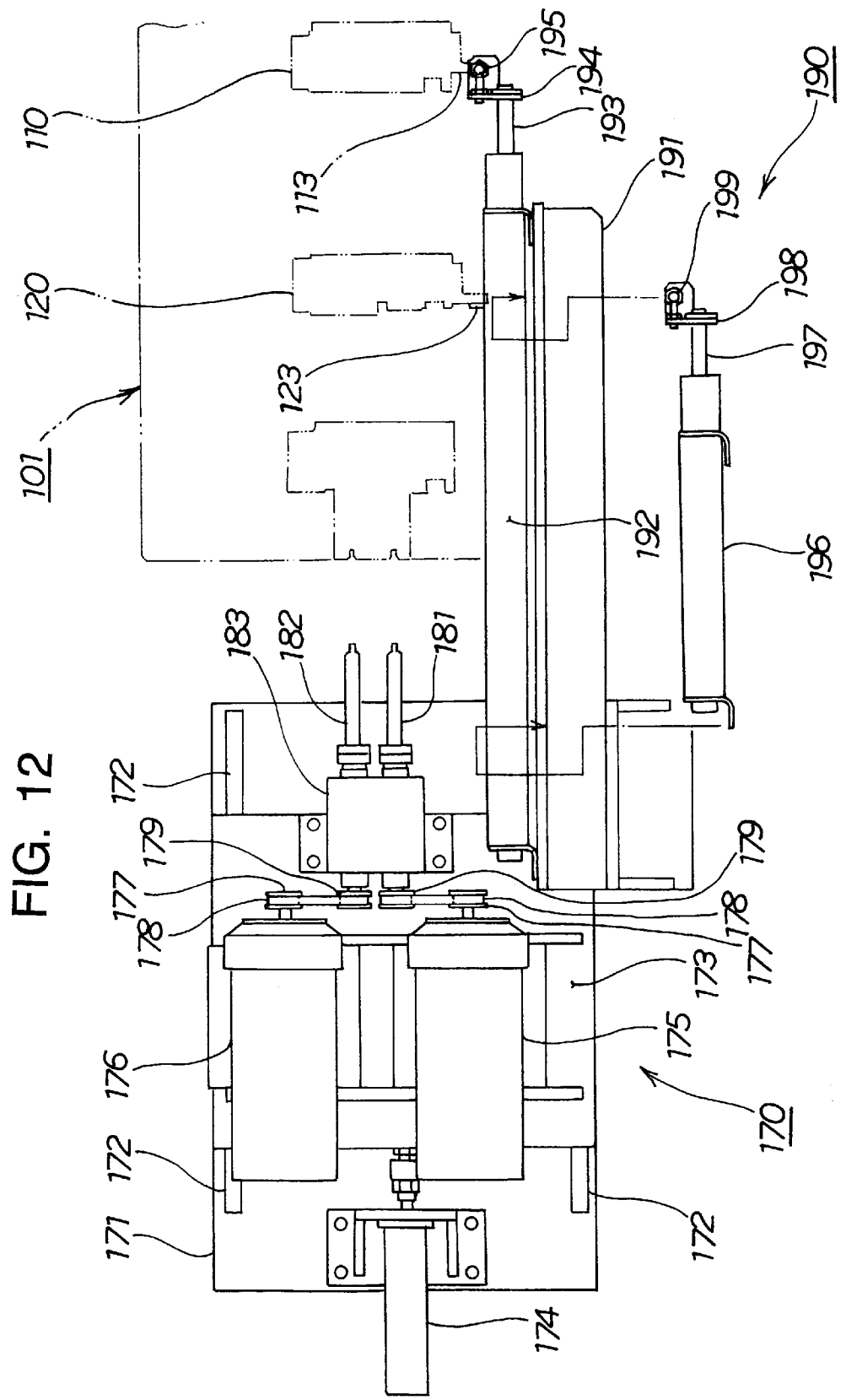
FIG. 12 is a plan view of a transfer pallet adjusting mechanism and a scaling mechanism according to the present invention.

FIG. 12 is a plan view of a transfer pallet adjusting mechanism and a scaling mechanism in the transfer pallet 101. The transfer pallet adjusting mechanism 170 includes a fixed base 171, a pair of rails 172 laid on the upper surface of the base 171, a slider 173 movable along the rails 172, a cylinder unit 174 for reciprocally moving the slider 173, first and second servo motors 175 and 176 mounted above the slider 173, and pulleys 177, timing belts 178 and pulleys 179 for transmitting torque from these servo motors 175 and 176. The transfer pallet adjusting mechanism 170 also includes first and second runner shafts 181 and 182, and a bearing 183 for rotatably supporting these runner shafts 181 and 182. In one modification, the servo motors 175 and 176 may be replaced by induction motors fitted with brakes.

The scaling mechanism 190 includes an upright bracket 191 secured to the base 171, a relatively long first scaling cylinder 192 fixed to the bracket 191 to extend in the horizontal direction, and a sensor 195 fixedly attached via a metal connector 194 to one end of a rod 193 of the scaling cylinder 192. The scaling mechanism 190 also includes a relatively short second scaling cylinder 196 fixed to the bracket 191 and located above the first scaling cylinder 192, and a sensor 199 fixedly attached via a metal connector 198 to one end of a rod 197 of the scaling cylinder 196. The one end of the rod 193 of the first scaling cylinder 192 is located adjacent to the scale bearer 113 of the first gripping mechanism 110 that is shown in FIG. 12 by phantom line, while the one end of the rod 197 of the second scaling cylinder 196 is located adjacent to the scale bearer 123 of the second gripping mechanism 120 that is also shown in FIG. 12 by phantom line.

Operation of the above-described joint assembly transfer pallet 101 will be described hereinbelow.

As previously noted in connection with the prior art, the transfer pallet ("transfer jig" in the prior art) is a carrier which is moved along a predetermined circular path in a "tact" (intermittent) fashion. The transfer pallet adjusting mechanism 170 and scaling mechanism 190 are both provided on one side of the circular path, and it is important to properly position these two mechanisms 170 and 190 relative to each other.

Figure 13:
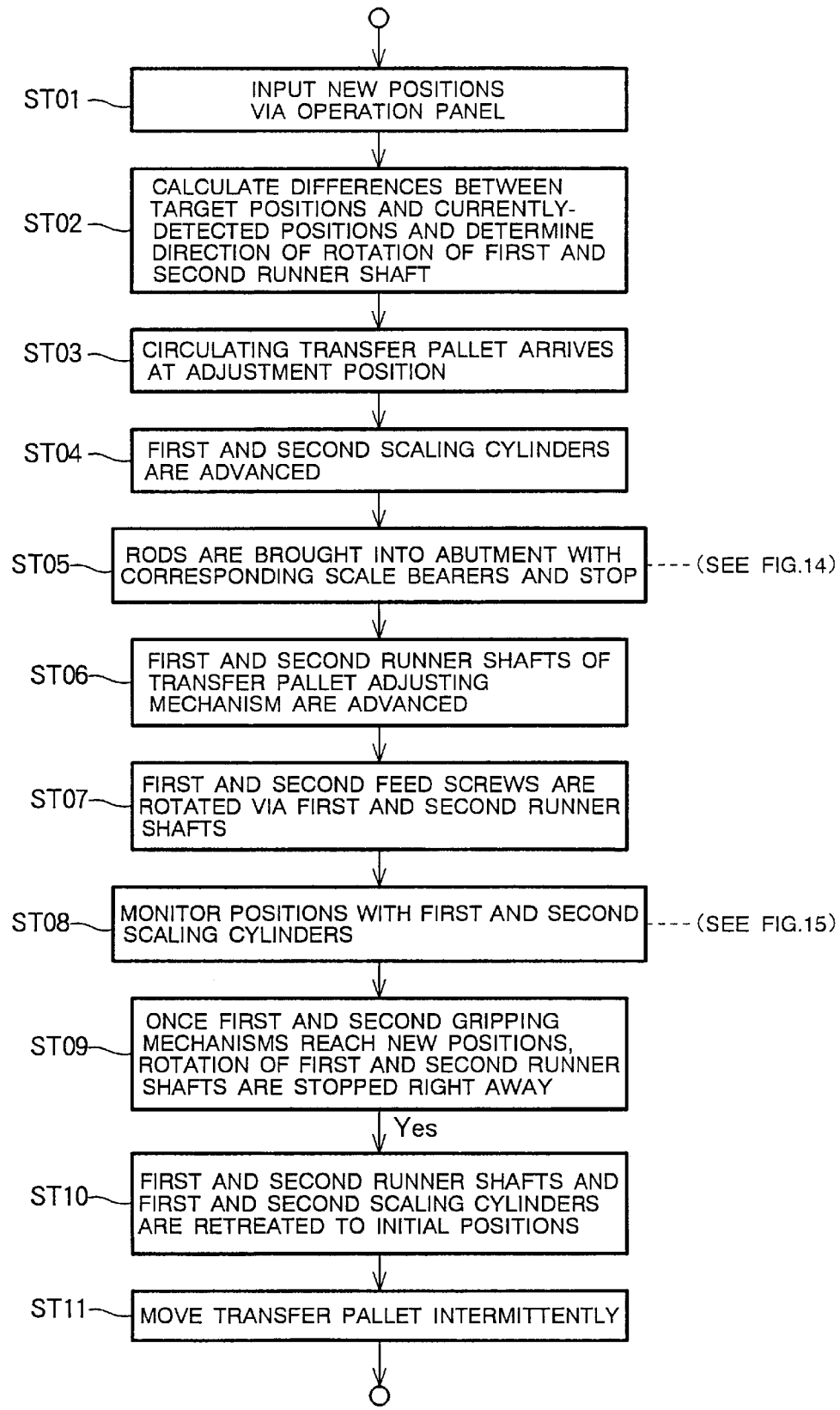
FIG. 13 is a flowchart illustrating transfer pallet adjusting operations.

FIG. 13 is a flowchart illustrating transfer pallet adjusting operations according to the present invention.

Step 1 ST01: New or target positions of the first and second gripping mechanisms 110 and 120 are entered via an operation panel.

Step 2 ST02: The controller calculates differences between the target positions and currently-detected positions of the first and second gripping mechanisms 110 and 120 so as to determine a direction in which the first and second runner shafts 181 and 182 should be rotated.

Step 3 ST03: Once the circulating transfer pallet 101 arrives at a predetermined adjustment position, necessary adjustments are initiated for adjusting transfer pallet 101.

Step ST04: First, the respective rods 193 and 197 of the first and second scaling cylinders 192 and 196 are advanced.

Step ST05: Once the rods 193 and 197 are brought into abutment against the corresponding scale bearers 113 and 123, the advancement of the first and second scaling cylinders 192 and 196 is stopped.

Figure 14:
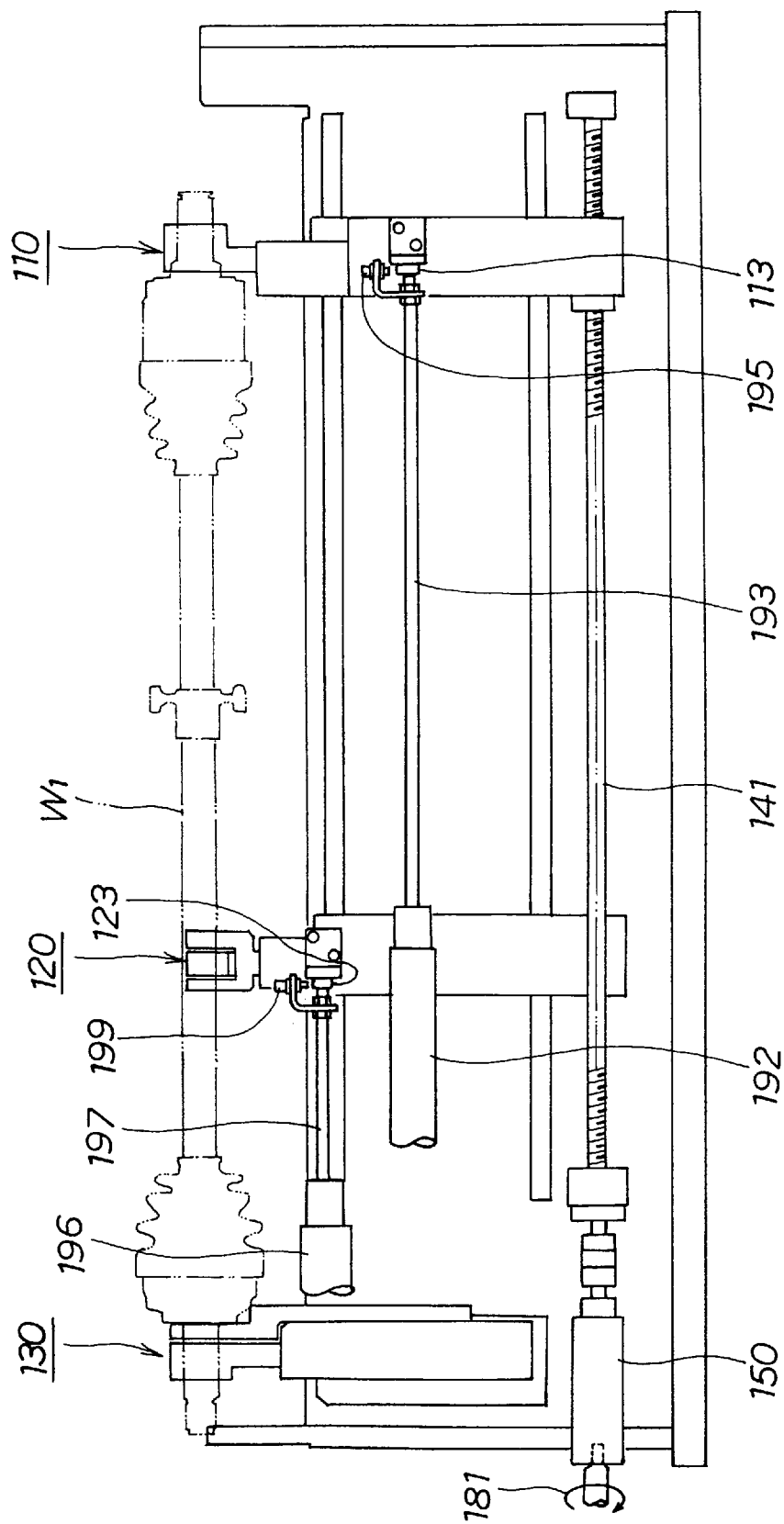
FIG. 14 is a view explanatory of a manner in which first and second gripping mechanisms operate on a long constant velocity joint assembly.

Specifically, FIG. 14 shows a condition where the distal end of the rod 193 of the first scaling cylinder 192 is in abutment against the scale bearer 113 of the first gripping mechanism 110 and the distal end of the rod 197 of the second scaling cylinder 196 is in abutment against the scale bearer 123 of the second gripping mechanism 120. Completion of the abutment of the rod 193 against the scale bearer 113 can be confirmed by the sensor 195 detecting the scale bearer 113, and completion of the abutment of the rod 197 against the scale bearer 123 can be confirmed by the sensor 199 detecting the scaling bearer 123.

Step 6 ST06: The transfer pallet adjusting mechanism 170 of FIG. 12 is activated to advance the first and second runner shafts 181 and 182 until the shafts 181 and 182 are brought into mating engagement with one end of the first and second rotational rods 155 and 156, respectively. Step ST07: The first and second feed screws 141 and 146 (FIG. 9) are rotated, via the first and second runner shafts 181 and 182, in the direction determined at step ST02.

Figure 15:
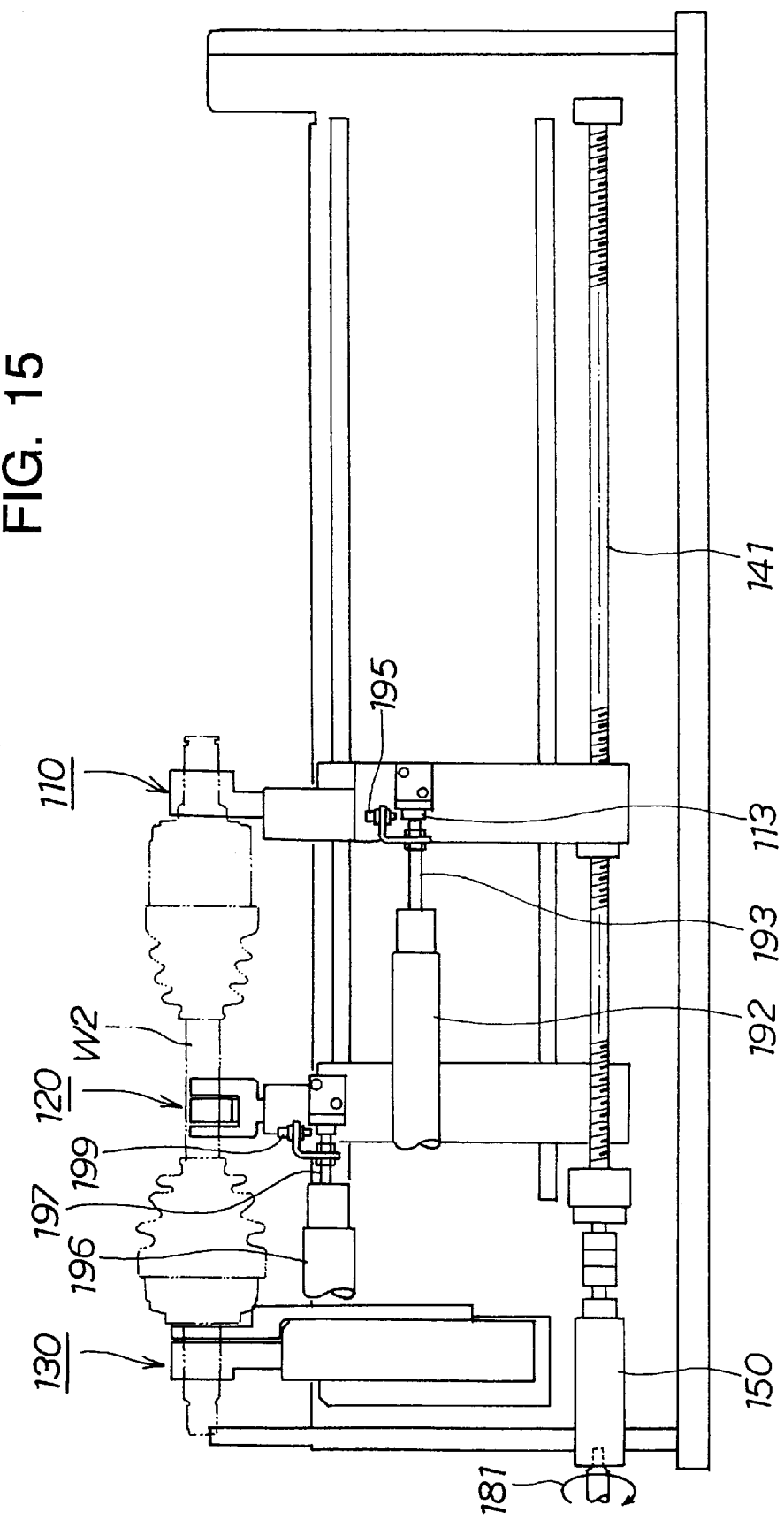
FIG. 15 is a view explanatory of a manner in which the first and second gripping mechanisms operate on a short constant velocity joint assembly.

Step ST08: Even during this time, the positions of the first and second gripping mechanisms 110 and 120 are continued to be monitored with the first and second scaling cylinders 192 and 196 (FIG. 12). Namely, in FIG. 15, the positions of the first and second gripping mechanisms 110 and 120 are monitored with the tips of the first and second scaling cylinder rods 193 and 197, Respectively. Reference character W2 in FIG. 15 represents a constant velocity joint assembly having a relatively short length.

Step 9 ST09: Once the first and second gripping mechanisms 110 and 120 reaches the new positions, the rotation of the first and second runner shafts 181 and 182 is immediately stopped.

Step ST10: Now that the transfer pallet adjustment has been completed, the first and second runner shafts 181 and 182 and first and second scaling cylinders 192 and 196 are caused to retreat to the respective initial positions.

Step ST11: The transfer pallet 101 is moved in an intermittent fashion.

By repeating the above-mentioned steps, the transfer pallet type adjustment can be conducted for a plurality of the transfer pallets in a sequential manner.

Because the transfer pallet adjusting mechanism, as noted above, is arranged to adjust positions of the first and second gripping mechanisms 110 and 120 in accordance with calculated differences between the currently detected positions and target positions of the two mechanisms 110 and 120, the transfer pallet adjusting operations can be conducted promptly without resorting to human labor, so that the production efficiency can be enhanced with less loads on the human operators. Also, because only one transfer pallet adjusting mechanism is provided for a plurality of the transfer pallets, the overall structure of the apparatus is substantially simplified, which would effectively reduce the necessary installment space and number of component parts necessary for the apparatus.

Moreover, because the joint assembly transfer pallet 101 of the present invention is provided with the moving mechanism 140 for moving the first and second gripping mechanisms 110 and 120 for positional adjustments thereof, the production efficiency can be effectively enhanced without resorting to human labor. Furthermore, because the rotating mechanism 150 for rotating the feed screws 141 and 146 is provided with a brake mechanism comprised of the female and male splines which operate as brakes when the first and second gripping mechanisms 110 and 120 are to not be adjusted in position but permit rotation of the feed screws only during the positional adjustments of the mechanisms 110 and 120. The provision of such a brake mechanism provides continued stable production without a possibility that the first and second gripping mechanisms 110 and 120 accidentally change their positions.

Next, a description will be made about an apparatus for setting a vertical position of a constant velocity joint assembly in the positioning apparatus of the present invention.

Figure 16:
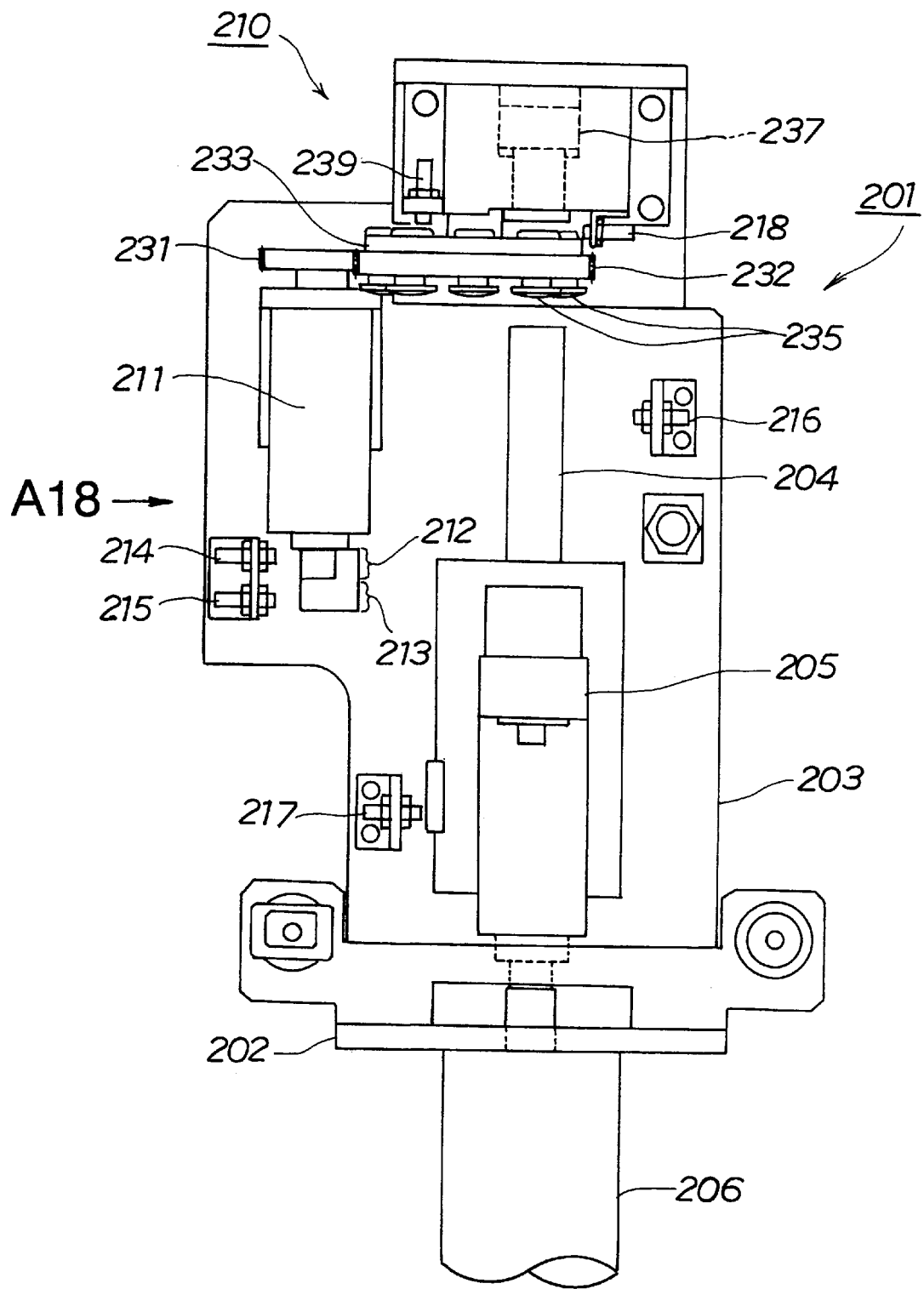
FIG. 16 is a front view of an apparatus for setting a vertical position of the constant velocity joint assembly according to an embodiment of the present invention.

FIG. 16 is a front view of the apparatus for setting a vertical position of a constant velocity joint assembly (hereinafter called a joint-vertical-position setting apparatus) 201, which includes a base 202, a support plate 203 fixedly mounted upright on the base 202, and a vertical rail 204 secured to the surface of the upright support plate 203. The joint-vertical-position setting apparatus 201 also includes a lifter 205 mounted on the rail 204 that is driven by a cylinder 206 to vertically slide along the rail. 204, and a stopper mechanism 210 attached to the top of the support plate 203.

Reference numeral 211 denotes an indexing motor which is deactivated once every predetermined angle (90° in the embodiment). Reference numerals 212 and 213 denote position detecting pieces (although the position detecting pieces form is a single integral component, it will be described as two separate components for convenience). Reference numerals 214, 215, 216, 217, 218 and 239 denote proximity switches, of which the switches 214 and 215 are intended for detecting respective positions of the position detector components 212 and 213, the switch 216 for detecting a central stop position of the lifter 205, and the switch 217 for detecting a lower stop position of the lifter 205.

Figure 17:
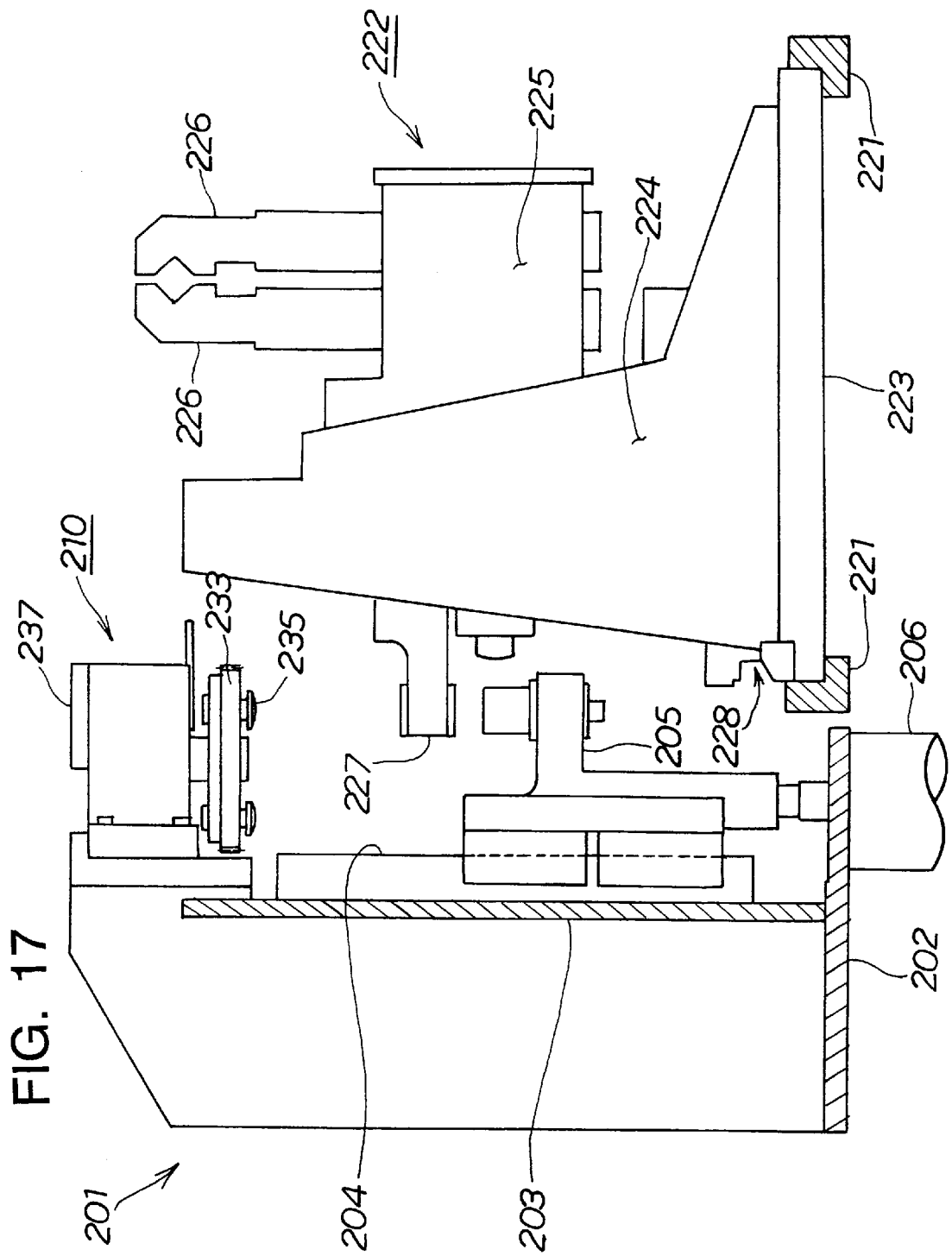
FIG. 17 is a sectional view as seen along a virtual center of FIG. 16, showing a relationship between the apparatus of FIG. 6 and a joint assembly transfer jig.

FIG. 17 is a sectional view as seen along a virtual center of FIG. 16, showing a positional relationship between the joint-vertical-position setting apparatus 201 and a transfer jig or pallet 222. The transfer jig 222, slidable along a pair of horizontal rails 221 in a direction perpendicular to the sheet of the drawing, includes a slide base 223, a pair of upright support plates 224 (only one of the plates 214 is shown in FIG. 17 with the other plate 224 is hidden behind it), a jig frame 225 vertically movable between the support plates 224, and a pair of clamping claws 226 fixedly mounted upright on the jig frame 225. Reference numeral 227 denotes an actuator arm extending horizontally from the jig frame 225. Further, reference numeral 228 denotes a positioning recess for determining a position of the jig frame 222 in the transfer direction. The actuator arm 227 of the jig frame 222 is located immediately above the lifter 205 of the joint-vertical-position setting-apparatus 201.

Figure 18:
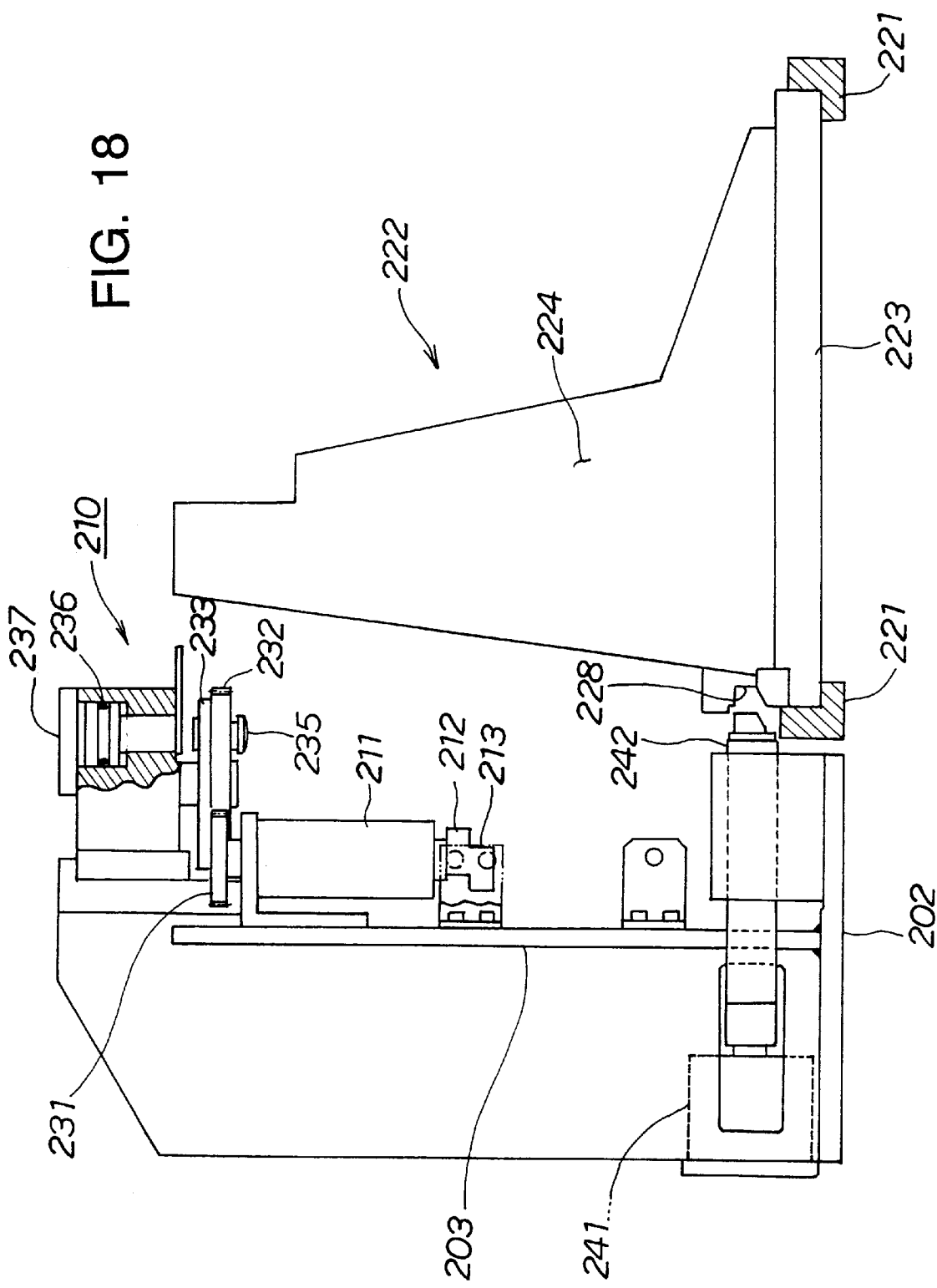
FIG. 18 is a view as seen in the direction of arrow A18 of FIG. 16, showing a positional relationship between the apparatus of FIG. 16 and the transfer jig.

FIG. 18 is a view as seen in the direction of arrow A18 of FIG. 16. Stopper mechanism 210 includes the indexing motor 211, a gear 231 mounted on the shaft of the indexing motor 211, a stopper plate 233 having an outer peripheral engaging portion 232 mating with the gear 231 and having a diameter as great as that of the gear 231, and a plurality (eight in the illustrated example) of stopper pieces 235 fixedly mounted on the stopper plate 233. The stopper mechanism 210 also includes an upper block 236 that supports the stopper plate 233 in such a manner that the plate 233 is rotatable in the horizontal direction, and a cylinder 237 received in the upper block 236.

Reference numeral 241 denotes a cylinder for positioning the slide base 223, and 242 denotes a base positioning piece fixed to the rod of the slide base positioning cylinder 241. The transfer jig 222 is positioned in the transfer direction by being fitted in the positioning recess 228.

Figure 19:
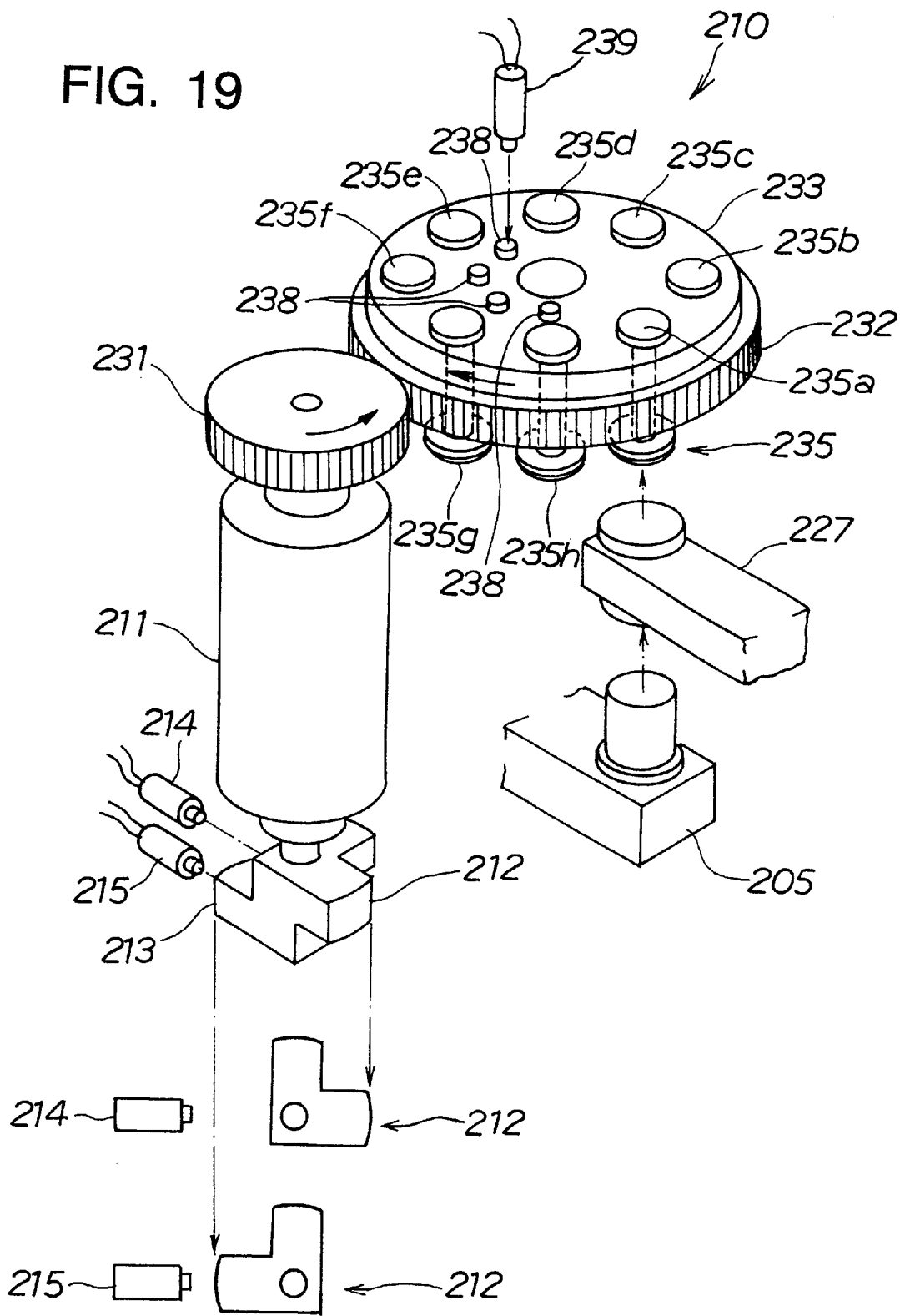
FIG. 19 is an exploded perspective view of a stopper mechanism.

FIG. 19 is an enlarged exploded perspective view of the stopper mechanism 210. Rotation of the indexing motor 211 through the gear 231 causes the stopper plate 233 to rotate so that a desired one of the stopper pieces 235 directly faces the actuator arm 227. The stopper pieces 235 have different heights, and these stoppers are distinguished from each other here with different numerals 235a to 235h, because it is very important here to accurately identify which one of the stopper pieces 235 directly faces the actuator arm 227.

As shown in an exploded plan in the lower left portion of FIG. 18, the position detector components 212 and 213 fixed to the shaft of the indexing motor 211 are each generally in the shape of the letter "L". When the position detector components 212 and 213 are located closest to the corresponding proximity switches 214 and 215, the switches 214 and 215 are turned ON; when components 212 and 213 are away from the proximity switches 214 and 215, the switches 214 and 215 remain OFF. For example, the proximity switch 214 is OFF in the illustrated condition, remains OFF even when the detector component 212 is rotated clockwise by 90°; however, it turns ON when detector component 212 is turned clockwise by 180° or 270°. Similarly, the proximity switch 215 is ON in the illustrated condition, turns OFF when the detector component 213 is rotated clockwise by 90° or 180°; however, it turns ON when the detector component 213 is rotated clockwise by 270°. Four projections 238 are formed on the upper surface of the stopper plate 233. When the proximity switch 15 directly faces any one of the projections 238, it outputs an ON signal; otherwise, it outputs an OFF signal. The stopper pieces 235a to 235h can be distinguished from each other by combinations of the ON/OFF signals from the three proximity switches 214, 215 and 239.

The following paragraphs describe operation of the stopper mechanism constructed in the above-mentioned manner.

FIG. 20 is a table showing various combinations of ON/OFF states of the three proximity switches 214, 215 and 239. It is assumed here that the stopper piece 235b is identified when the switch 214 is ON (logical value "1"), the switch 215 is OFF (logical value "0") and the switch 215 is OFF ("0"). Similarly, each of the proximity switches is identifiable by a combination of the logical values "1" and "0" of the proximity switches 214, 215 and 239. Any designated one of the stopper pieces 235 can be accurately positioned in an automatic manner, by deactivating the indexing motor 11 immediately when the three proximity switches 214, 215 and 235 detects the arrival, at a predetermined location, of the designated stopper piece 235.

In FIG. 17, once one of the stopper pieces 235 is selected through the above-mentioned procedures, the cylinder 237 is activated to lower the stopper plate 233. Then, the lower cylinder 206 is advanced upward so that the actuator 227 is pushed upward, via the lifter 205, into abutment against the stopper piece 235 retained by the plate 233, thereby stopping the cylinder 237. This position is a central position which can be identified by the central-position detecting proximity switch 216 (FIG. 16). In this central position, the position of the boot's end surface is adjusted and a fastening band is wound on the boot with an underlying back bar (FIGS. 22A and 22B) for subsequent welding operations. Then, as the cylinder 237 is caused to retreat, the actuator arm 227 is moved back to an initial upper position by means of the cylinder 206. FIG. 21 shows the operating condition of the stopper mechanism 210 where the upper end surface of the actuator arm 227 abuts against and is held by the stopper piece 235.

Figure 22A:
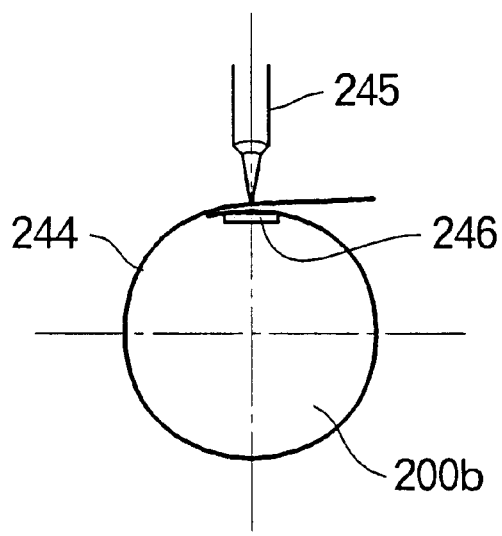
FIGS. 22A and 22B are views showing a manner in which a fastening band is wound and spot-welded on the constant velocity joint assembly.
Figure 22B:
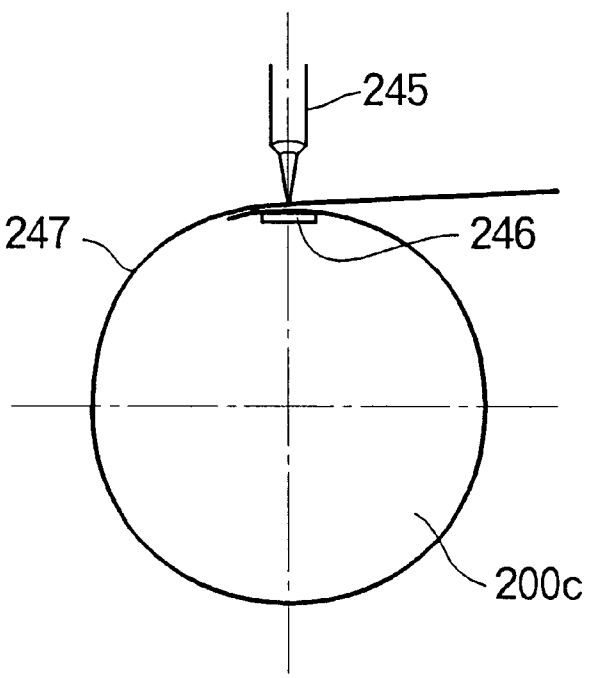

FIGS. 22A and 22B are views showing a manner in which the fastening band is wound and spot-welded on the constant velocity joint assembly. More specifically, FIG. 22A shows an exemplary manner in which a fastening band 244 is tightly wound around the constant velocity joint assembly of a relatively small diameter 200b and welded in its overlapping portions with a beam radiated from a welding gun 245, while FIG. 22B shows an exemplary manner in which a fastening band 247 is tightly wound around the constant velocity joint assembly of a relatively large diameter 200c and welded in its overlapping portions with a beam radiated by the welding gun 245. Reference numeral 246 represents the welding back bar 246 held under the overlapping band portions.

It is important to note here that, by selecting one of the eight stopper pieces 235a to 235h (FIG. 19) as earlier mentioned, the bands 244 and 247 can be both positioned at a same height irrespective of different diameters of the constant velocity joint assemblies 200b and 200c. This eliminates the need for adjusting the height of the welding gun 245, thus significantly simplifying the welding mechanism.

By virtue of the eight stopper pieces 235a to 235h, the present invention is readily adaptable to eight different types (lengths) of the constant velocity joint assembly, although just two types are illustrated in FIGS. 22A and 22B. In addition, because the stopper pieces are provided on the disk-shaped stopper plate 233, more than eight stopper pieces 235 may be provided by reducing the pitch between the stopper pieces. Consequently, as compared to the prior art capable of handling only two types of the constant velocity joint assembly, the present invention can handle eight or more different types and is therefore very useful for production of multi-type constant velocity joint assemblies.

The indexing motor 211 as a drive means may be a servo motor provided with a rotational angle indexing means such as a rotary encoder; this can greatly reduce the number of the proximity switches to thereby make the apparatus more compact.

As described above, the joint-vertical-position setting apparatus is characterized in that the upper limit position of the actuator arm of the jig frame supporting a constant velocity joint assembly is properly determined depending the type of the assembly and the stopper mechanism is driven, by a motor, to adjust the welding position to the same height for every possible type of the joint assemble. With such an arrangement, it is possible to readily set a vertical position of every-type constant velocity joint assembly.

Further, because the stopper mechanism includes the stopper pieces mounted on the disk-shaped stopper plate rotatable via the indexing motor, the number of the stopper pieces can be readily increased, so that the number of types of constant velocity joint assembly that can be handled by the present invention can be readily increased. In addition, because the stopper pieces can be distinguished from each other by combinations of ON/OFF signals from the proximity switches, the joint-vertical-position setting apparatus can employ inexpensive proximity switches and can thus be manufactured at low costs. Further, the indexing motor may be a servo motor provided with a rotational angle indexing means such as a rotary encoder; this can greatly reduce the number of the proximity switches to thereby make the apparatus more compact.

Figure 23:
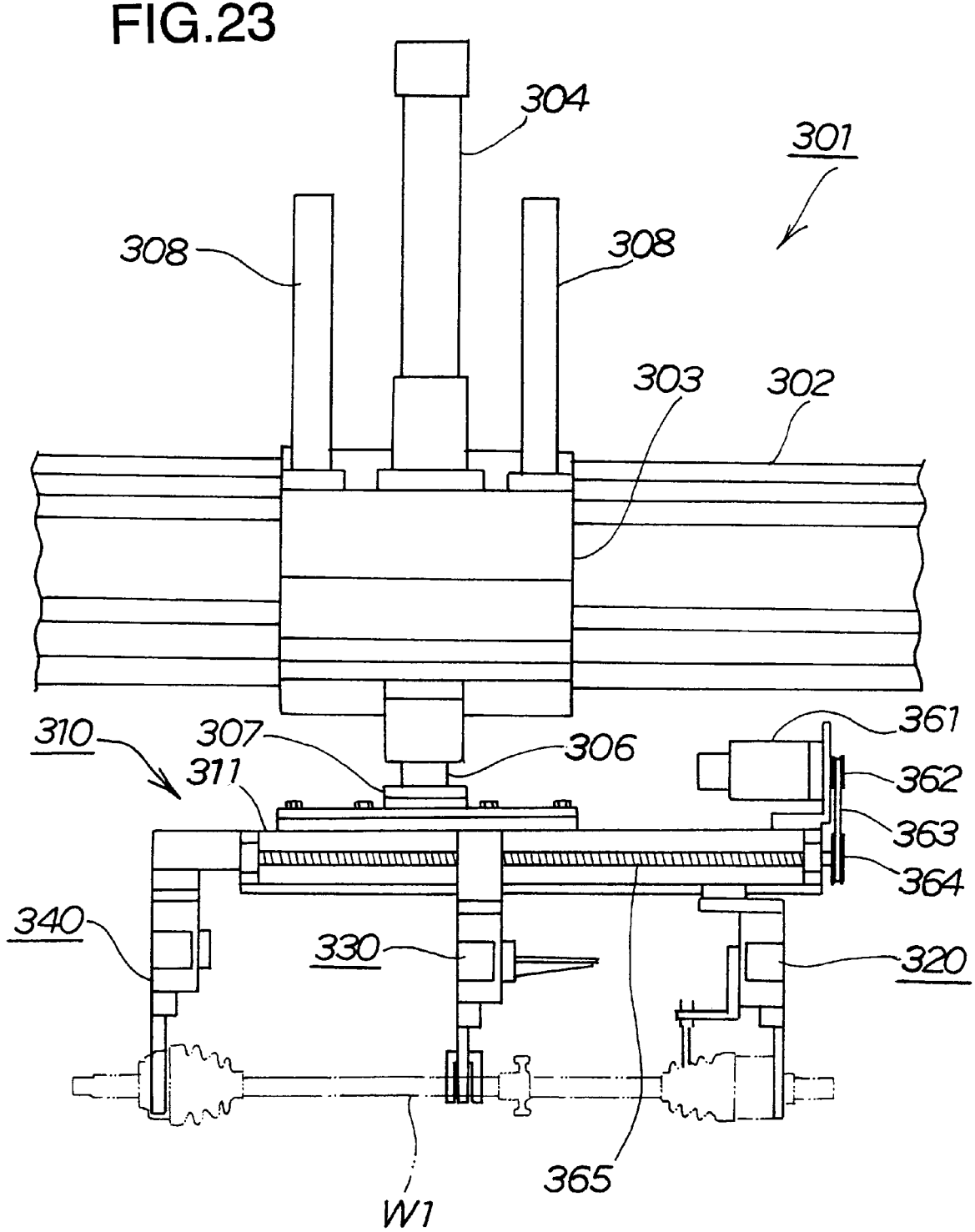
FIG. 23 is a view showing a general structure of a joint assembly loader apparatus in the constant velocity joint assembly of the present invention.

A description will next be made about the joint assembly loader apparatus, the general structure of which is illustrated in FIG. 23. As shown, the joint assembly loader apparatus 301 includes a slider 303 movable along a horizontal rail 302, a vertically movable cylinder unit 304 secured to the slider 303, and a joint gripping apparatus 310 connected via a rotary coupling 307 to the piston rod 306 of the cylinder unit 304. Reference numeral 308 denotes a guide rod. The entire joint gripping apparatus 310 is allowed to move in the vertical direction by activation of the vertically movable cylinder unit 304 and is also allowed to pivot by some 90° through the rotary coupling 307.

Figure 24:
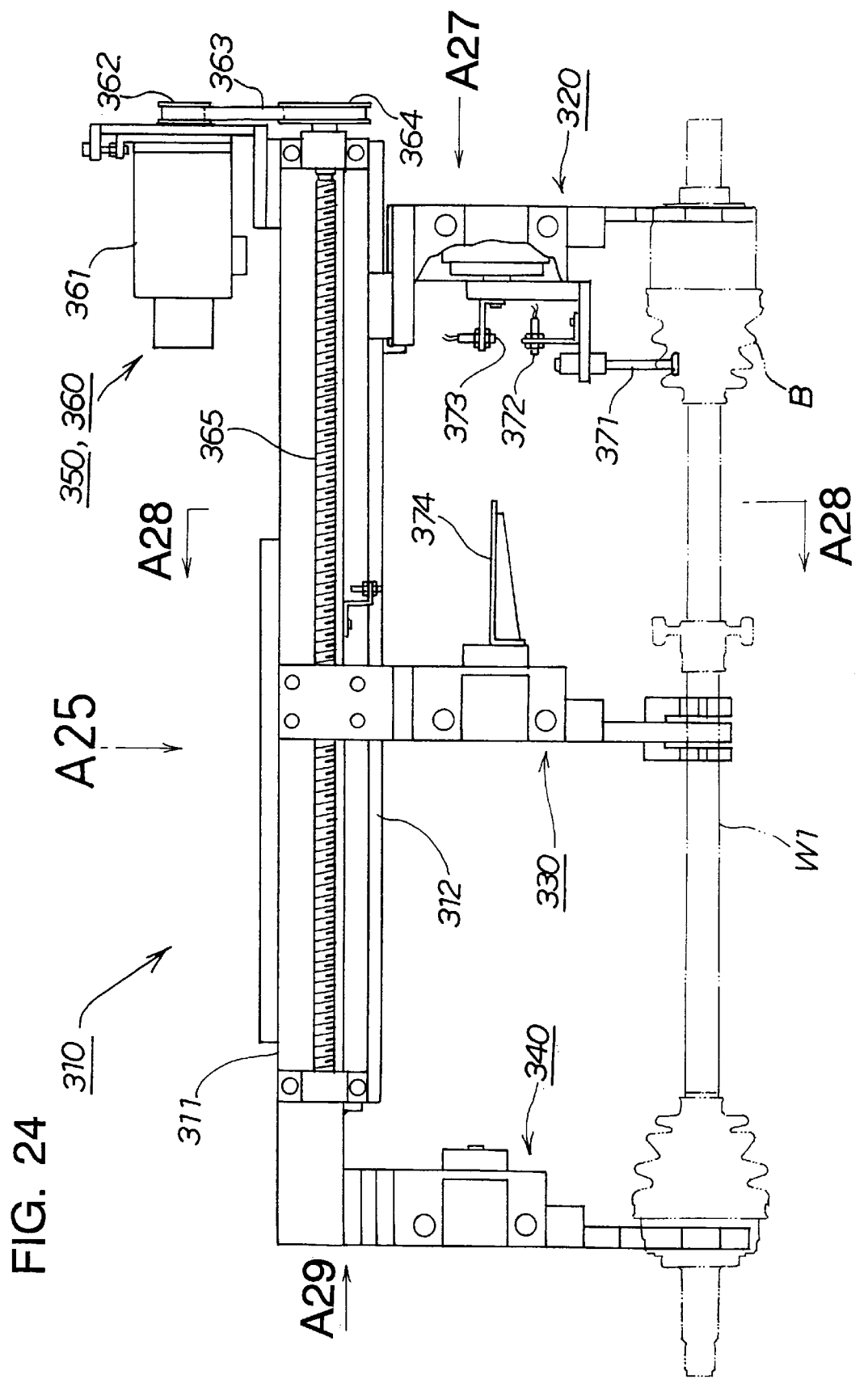
FIG. 24 is a front view of a joint assembly gripping apparatus in the loader apparatus of FIG. 23.

Detailed structure and operation of the joint gripping apparatus 310 are as follows. In FIG. 24, the joint gripping apparatus 310 includes a pivotable beam 311, first and second gripping mechanisms 320 and 330 mounted on one (right in the figure) end and central portion, respectively, of the pivotable beam 311 for horizontal movement therealong, and a third gripping mechanism 340 fixed to the other end of the beam 311. The joint gripping apparatus 310 also includes first and second moving mechanisms 350 and 360 for moving the first and second gripping mechanisms 320 and 330.

Figure 25:
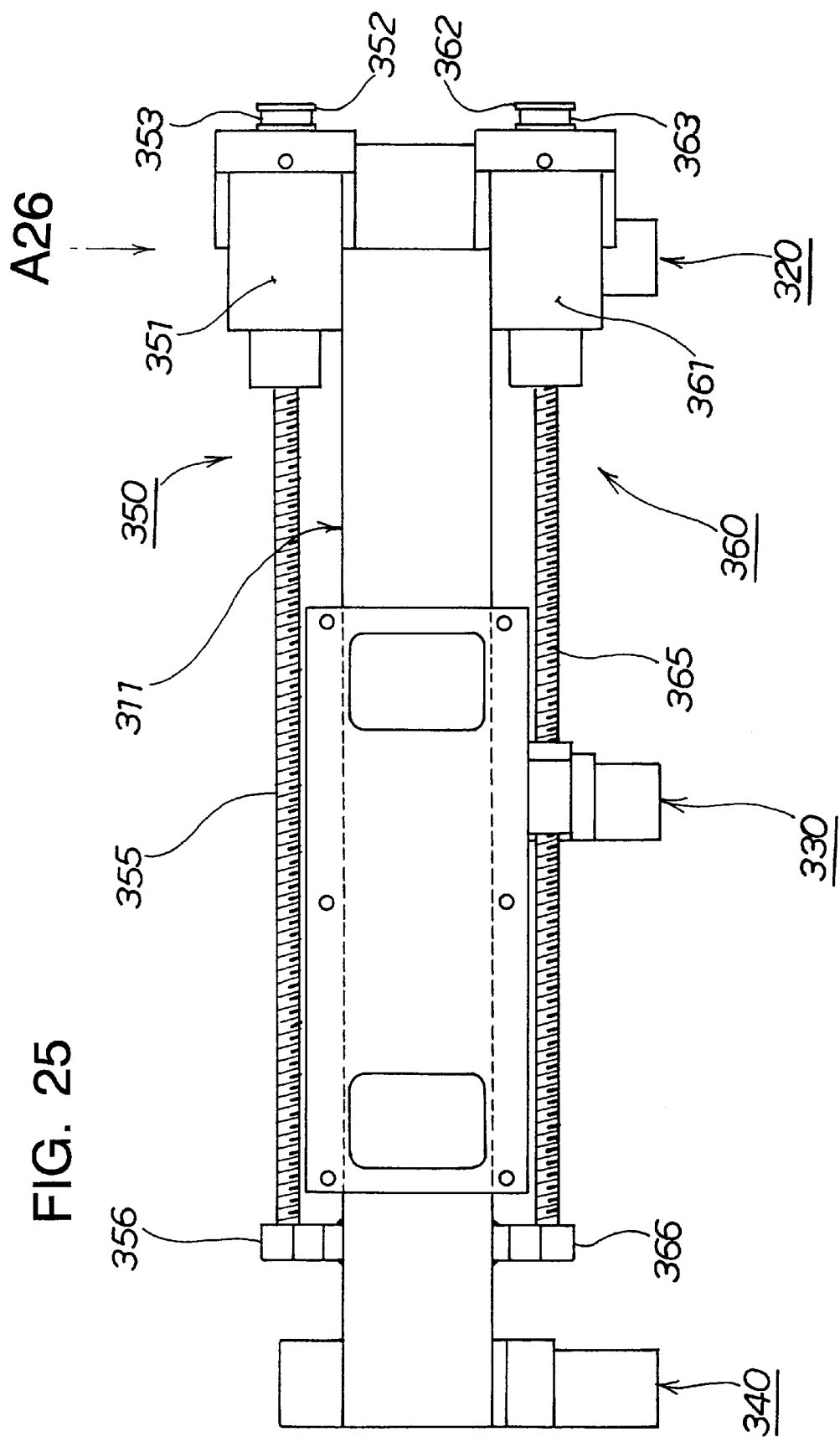
FIG. 25 is a plan view of the joint assembly gripping apparatus as seen in the direction of arrow A25 of FIG. 24.

FIG. 25 is a bottom view of the joint gripping apparatus 310 as seen in the direction of arrow A25 of FIG. 24. As shown, the first moving mechanism 350 includes a servo motor 351, a pulley 352, a belt 353, another pulley 354 (see FIG. 26) and a feed screw 355. Reference numeral 356 denotes a screw bearing block. The second moving mechanism 360 includes a servo motor 361, a pulley 362, a belt 363, another pulley 364 (see FIG. 24) and a feed screw 365. Rotation of the feed screw 365 causes movement of the second gripping mechanism 330. Reference numeral 366 denotes a screw bearing block.

Figure 26:
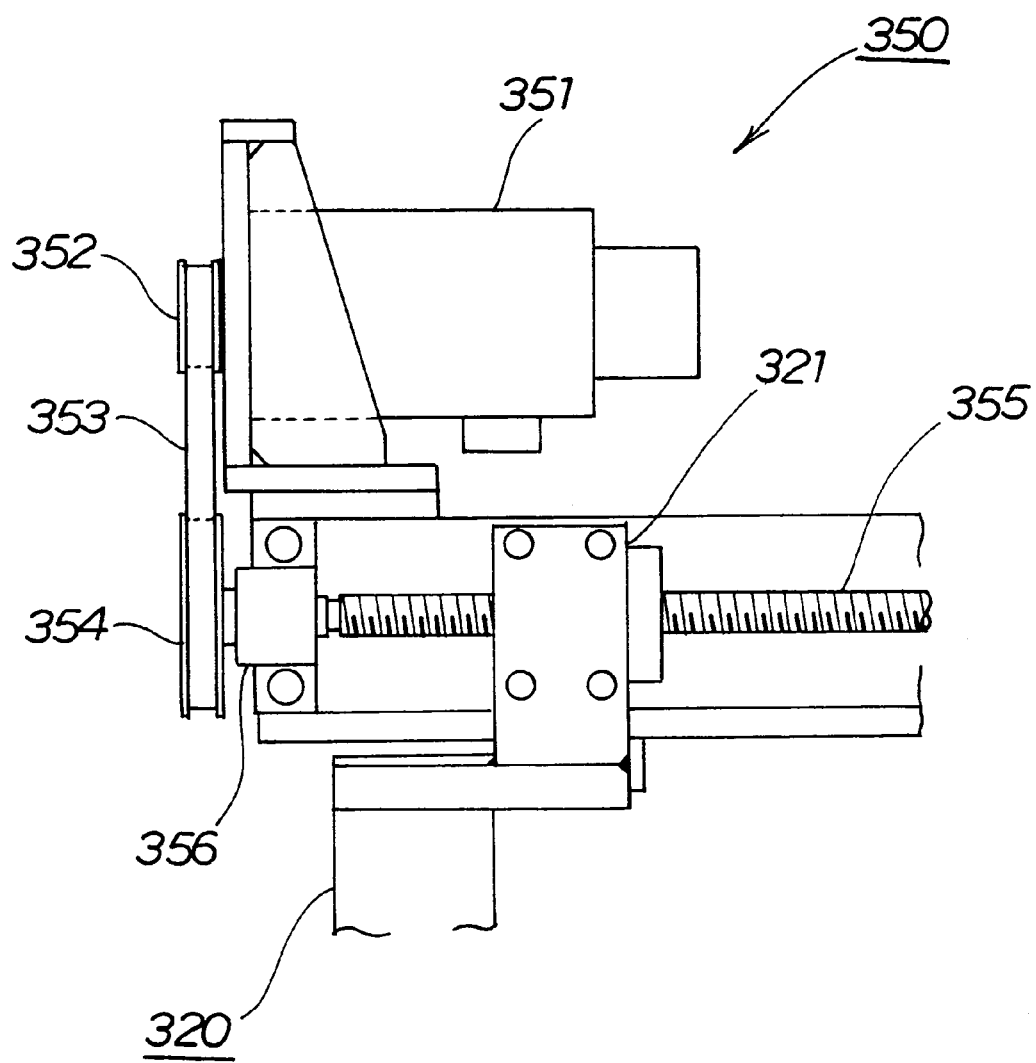
FIG. 26 is a view of the joint assembly gripping apparatus as seen in the direction of arrow A26 of FIG. 25.
Figure 27:
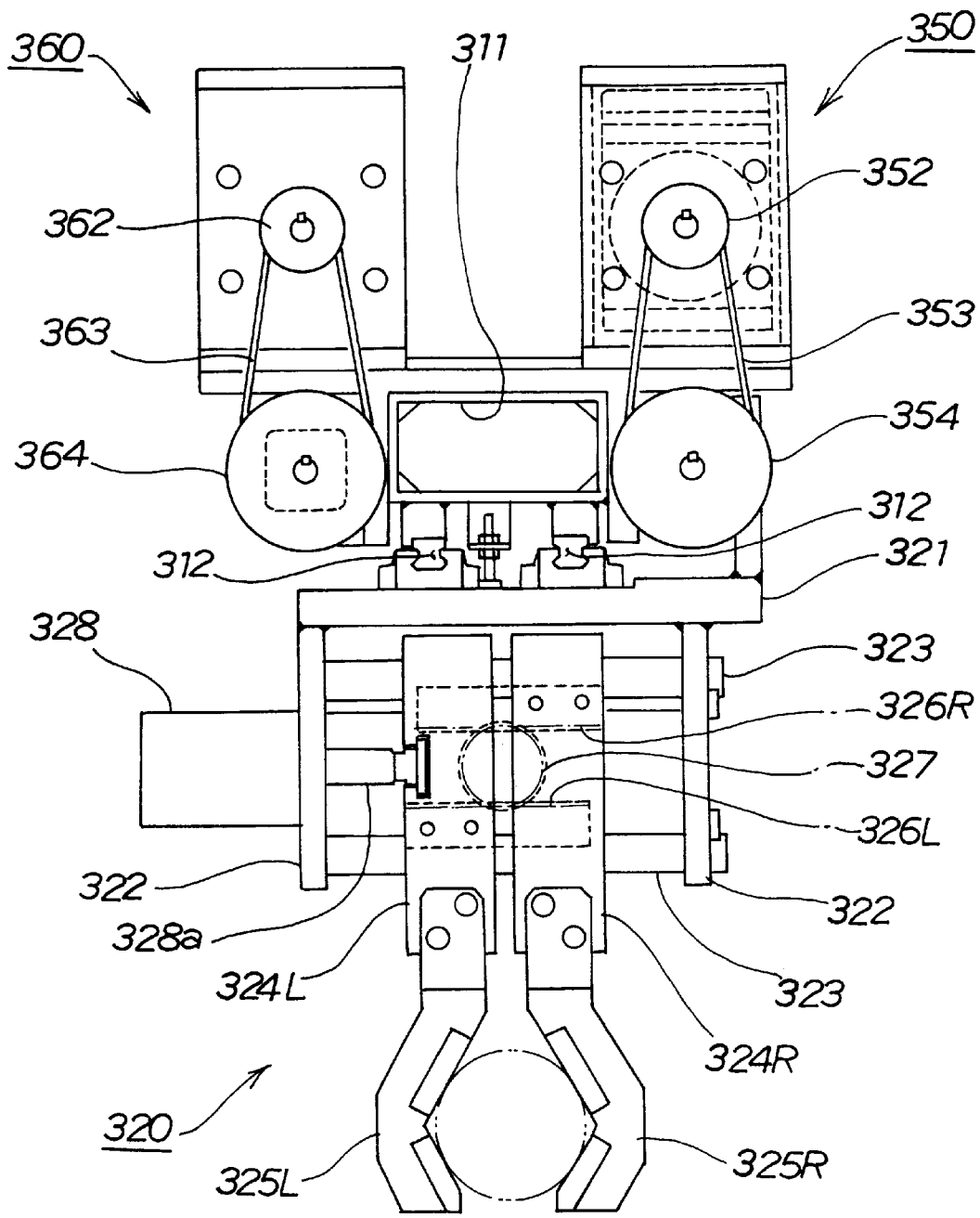
FIG. 27 is a view of the joint assembly gripping apparatus as seen in the direction of arrow A27 of FIG. 24.

FIG. 26 is a view of the joint assembly gripping apparatus 310 as seen in the direction of arrow A26 of FIG. 25, which shows engaging relation between the slider 321 and feed screw 355 of the first gripping mechanism 320 that is moved by the rotation of the feed screw 355. FIG. 27 is a view of the joint assembly gripping apparatus 310 as seen in the direction of arrow A27 of FIG. 24, showing the pulley 352, belt 353 and pulley 354 of the first moving mechanism 350 and the pulley 362, belt 363 and pulley 364 of the second moving mechanism 360.

The first gripping mechanism 320 includes rails 312 underlying the pivotable beam 311, the first slider 321 movable along the rails 312, a pair of opposed plates 322 depending from the first slider 321, and two horizontal guide rods 323 extending between the plates 322. The first gripping mechanism 320 also includes a pair of left and right brackets 324L and 324R movable on and along the guide rods 323, gripping claws 325L and 325R attached to the respective lower ends of the brackets 324L and 324R, and two racks 326L and 326R fixed to the brackets 324L and 324R, respectively. The first gripping mechanism 320 further includes a pinion 327 engaging with both the racks 326L and 326R, and a gripping cylinder 328 for pushing or pulling one of the brackets 324L. The pinion 327 is rotatably mounted on the first slider 321.

As the gripping cylinder 328 is activated to withdraw its piston rod 328a, the left bracket 324L is pulled leftward to cause the left rack 326L to move together with the bracket 324L. Such movement of the left rack 326L in turns causes the right rack 326R to move in the opposite direction via the pinion 327. Consequently, by withdrawing the piston rod 328a, the left and right gripping claws 325L and 325R are moved away from each other to an open position; conversely, by advancing the piston rod 328a, the left and right gripping claws 325L and 325R are moved toward to a closed position.

Figure 28:
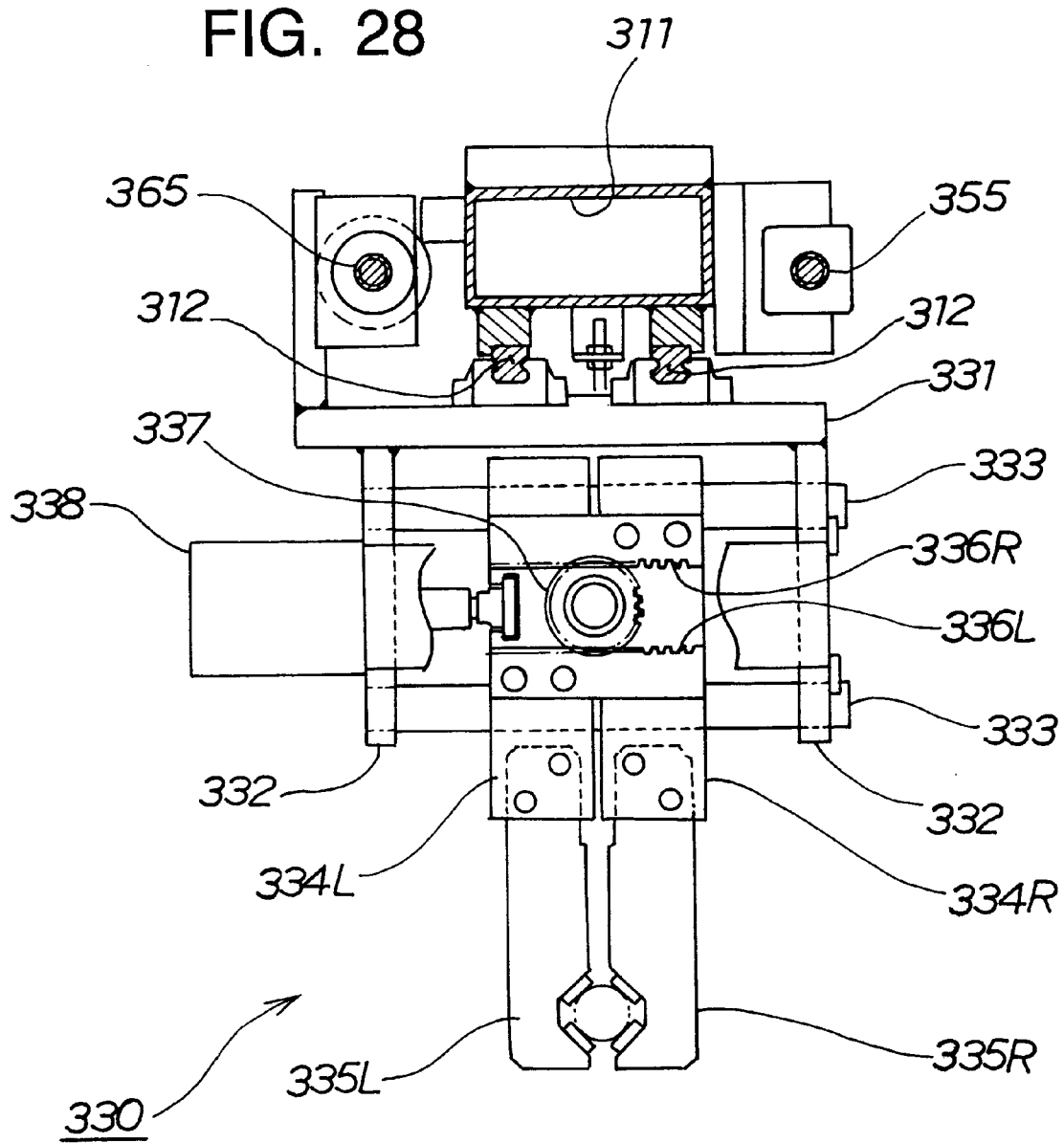
FIG. 28 is a sectional view of the joint assembly gripping apparatus taken along the line 28—28 of FIG. 24.

FIG. 28 is a sectional view of the joint assembly gripping apparatus 310 taken alone the line 28—28 of FIG. 24. In FIG. 28, the second gripping mechanism 330, similarly to the first gripping mechanism 320 of FIG. 27, includes a second slider 331 movable along a pair of rails 312 underlying a pivotable beam 311, a pair of opposed plates 332 depending from the second slider 331, and two horizontal guide rods 333 extending between the plates 332. The second gripping mechanism 330 also includes a pair of left and right brackets 334L and 334R movable on and along the guide rods 333, gripping claws 335L and 335R attached to the respective lower ends of the brackets 334L and 334R, and two racks 336L and 336R fixed to the brackets 334L and 334R, respectively. The second gripping mechanism 330 further includes a pinion 337 engaging with both the racks 336L and 336R, and a gripping cylinder 338 for pushing or pulling one of the brackets 334L. Operation of the second gripping mechanism 330 is not described here because it operates in the same manner as the first gripping mechanism 320 already described in relation to FIG. 27.

Figure 29:
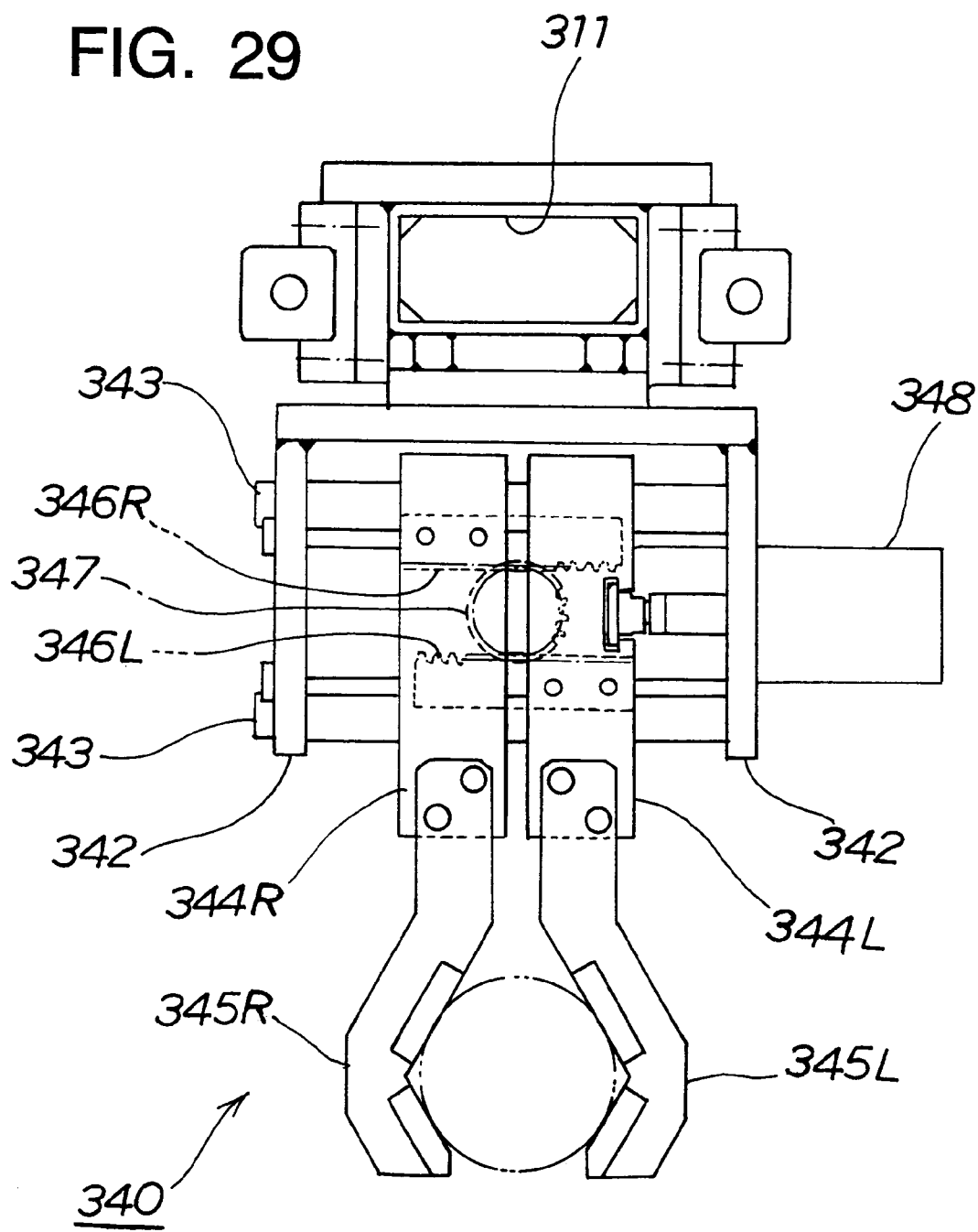
FIG. 29 is a view of the joint assembly gripping apparatus as seen in the direction of arrow A29 of FIG. 24.

Further, FIG. 29 is a sectional view of the joint assembly gripping apparatus taken alone the line 29—29 of FIG. 24. In FIG. 29, the third gripping mechanism 340 includes a pair of opposed plates 342 depending from the lower surface of a pivotable beam 311, a pair of guide rods 343 extending between the plates 342, and a pair of left and right brackets 344L and 344R movable on and along the guide rods 343 (in this gripping mechanism 340, these components are placed in a horizontally opposite arrangement to those in the first and second gripping mechanisms of FIGS. 27 and 28). The third gripping mechanism 340 also includes gripping claws 345L and 345R attached to the respective lower ends of the brackets 344L and 344R, and two racks 346L and 346R fixed to the brackets 344L and 344R, respectively. The third gripping mechanism 340 further includes a pinion 347 engaging with both the racks 346L and 346R, and a gripping cylinder 348 for pushing or pulling one of the brackets 344L. Operation of this third gripping mechanism 340 is not described here because it operates in generally the same manner as the first gripping mechanism 320 already described in relation to FIG. 27.

Figure 30:
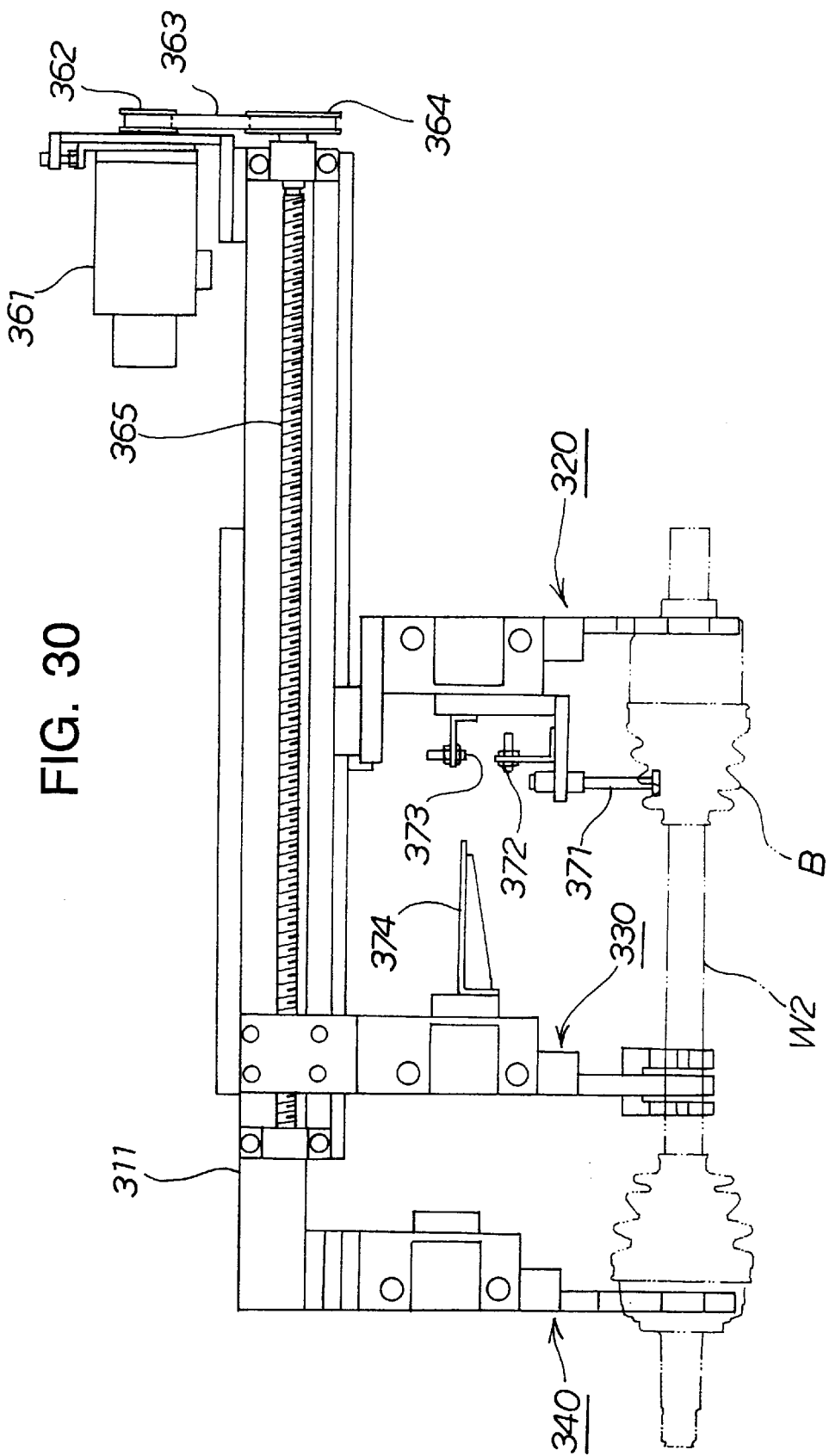
FIG. 30 is a view explanatory of operation of the joint assembly gripping apparatus.

The following paragraphs describe general operation of the joint assembly gripping apparatus 310 of the loader apparatus according to the present invention, with reference to FIGS. 24, 25 and 30. FIG. 24 shows an operating condition of the joint assembly gripping apparatus 310 where the first and second gripping mechanisms 320 and 330 are set in position for gripping therebetween the long-type constant velocity joint assembly W1 represented in phantom line. Once the constant velocity joint assembly W1 is actually gripped by the first and second gripping mechanisms 320 and 330, a detecting rod 371 attached to the first gripping mechanism 320 is pushed upward by the protective boot B. The pushed-upward detecting rod 371 acts on a workpiece detecting switch 372, which thus detects that the constant velocity joint assembly W1 has been actually gripped. A sensor 373 is provided, above the workpiece detecting switch 372, to detect excessive nearness of the second gripping mechanism 330; specifically, this excessive nearness sensor 373 detects a stopper plate 374 of the second gripping mechanism 330 when the stopper plate 374 is too close thereto.

When the joint assembly to be handled by the joint assembly gripping apparatus 310 is changed from the long-type assembly to a short-type assembly and thus the gripping apparatus 310 has to be adapted to the short type, the first and second moving mechanisms 350 and 360 shown in FIG. 25 are activated to rotate the corresponding feed screws 355 and 365.

FIG. 30 shows another operating condition of the joint assembly gripping apparatus 310 where the first and second gripping mechanisms 320 and 330 are moved to appropriate positions for gripping therebetween the short-type constant velocity joint assembly W2 represented in phantom line. The feed screws 355 and 365 (in FIG. 30, the feed screw 355 is hidden behind the other feed screw 365) are capable of precisely positioning the first and second gripping mechanisms 320 and 330 at any desired positions at any time, under remote control.

Whereas the feed screws 355 and 365 in the joint assembly loader apparatus have been described above as driven by the servo motor via the pulleys and belt, the feed screws 355 and 365 may be driven directly by the servo motor with the pulleys and belt omitted.

With the above-described arrangement that the servo motor is driven differently depending on a type or length of a constant velocity joint assembly and the first and second gripping mechanisms are moved by the servo motor rotating the corresponding feed screws, the present invention permits remote control, automated operation, and prompt adjustments for each type of constant velocity joint assembly without resorting to human labor, thereby enhancing operation efficiency.

A description will now be made about another boot positioning apparatus of the present invention.

Figure 31:
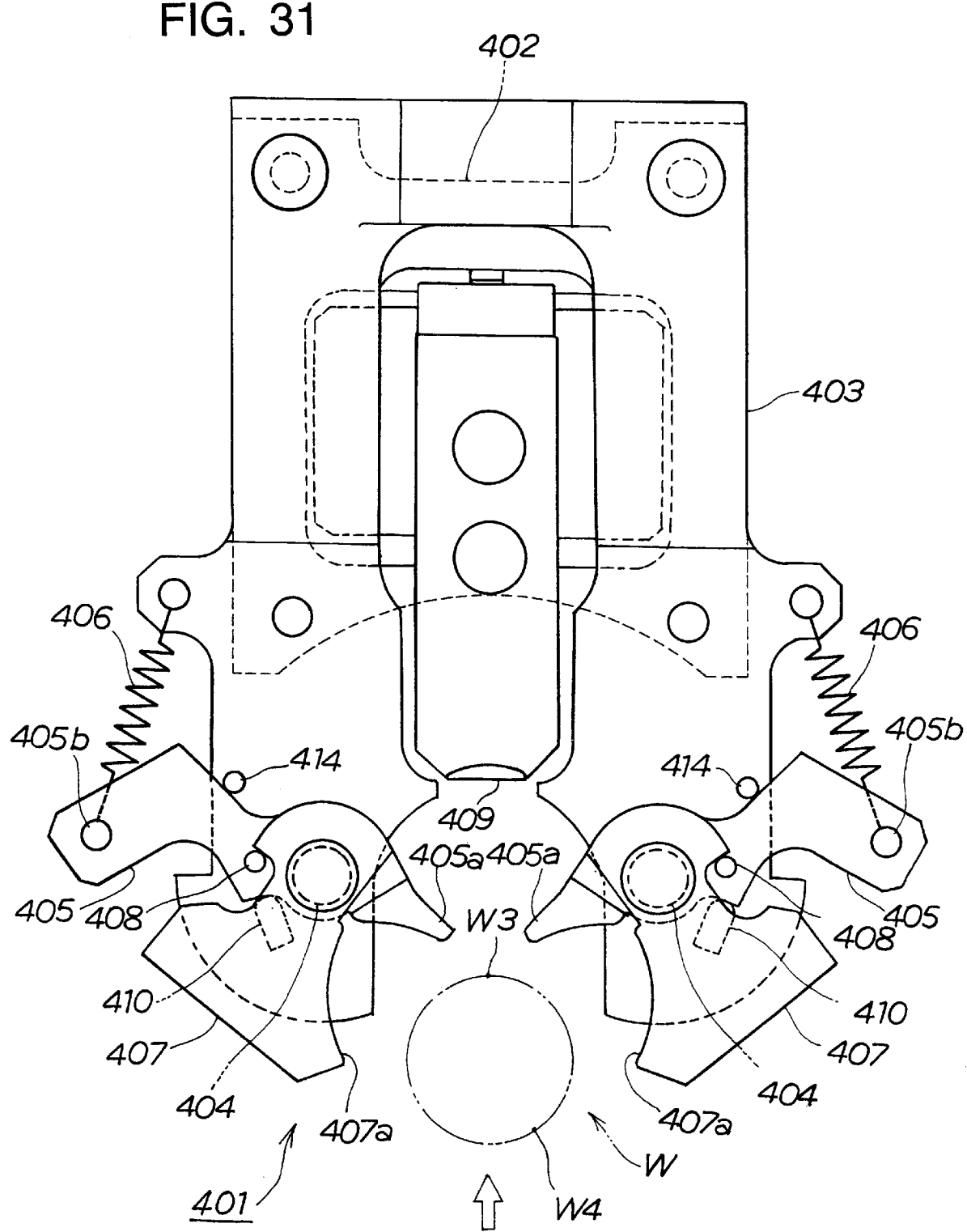
FIG. 31 is a front view of another boot positioning apparatus of the present invention.

In FIG. 31, the boot positioning apparatus 401 includes a slider 402 movable along the axial length of a shaft W of a constant velocity joint assembly, a bracket 403 of a virtually inverted U-shape depending from the slider 402, and a pair of upper pressing members 405 having a pair of left and right upper claws 405a. Each of the claws 405a is pivotably mounted, via a pin 404, on an lower portion of the bracket 403 so as to abut against an upper circumferential surface W3 of the shaft W. The boot positioning apparatus 401 also includes springs 406 normally urging the upper pressing members 405 in such a direction where the pressing members 405 press the shaft W downward by means of the claws 405a, and a pair of lower pressing members 407 having a pair of left and right lower claws 407a. The lower claws 407a are pivotably mounted, via the pins 404, on the above-mentioned lower portion of the bracket 403 for abutting against a lower circumferential surface W4 of the shaft W so that the shaft W is vertically gripped by the upper claws 405a and the lower claws 407a. The boot positioning apparatus 401 further includes spring mechanisms 410 normally urging the lower pressing members 407 in the gripping direction, and stoppers 408 for limiting the pivotal movement of the corresponding lower pressing members 407. Reference numeral 409 represents a back bar to be used for subsequent band winding and welding operations.

Figure 32:
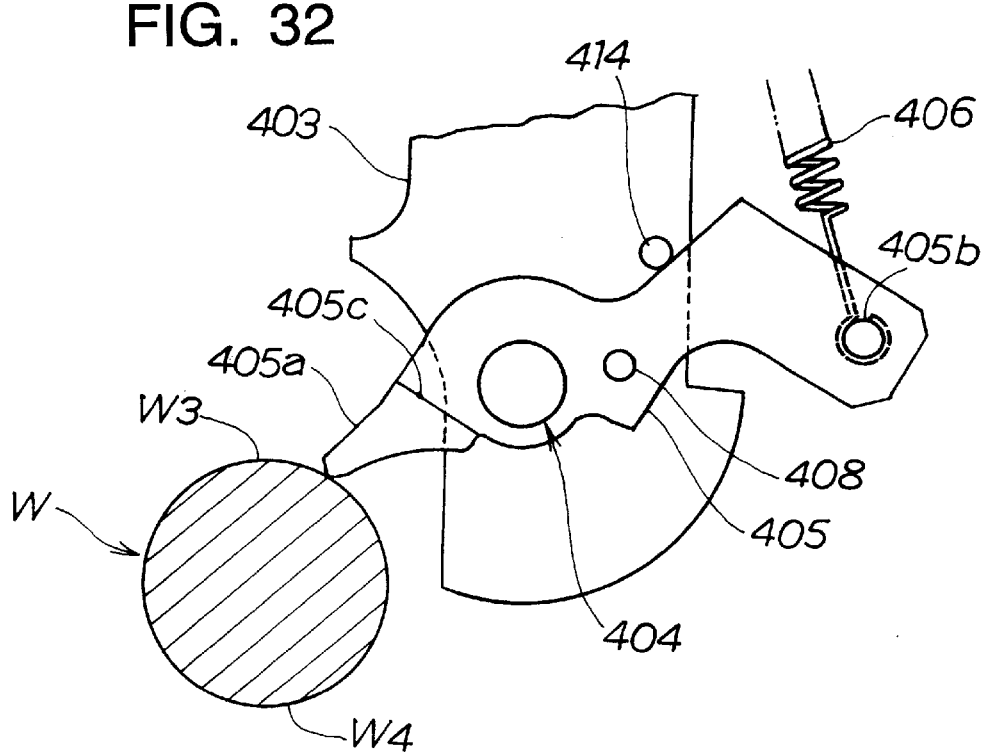
FIG. 32 is a view showing in detail an upper pressing member.
Figure 33:
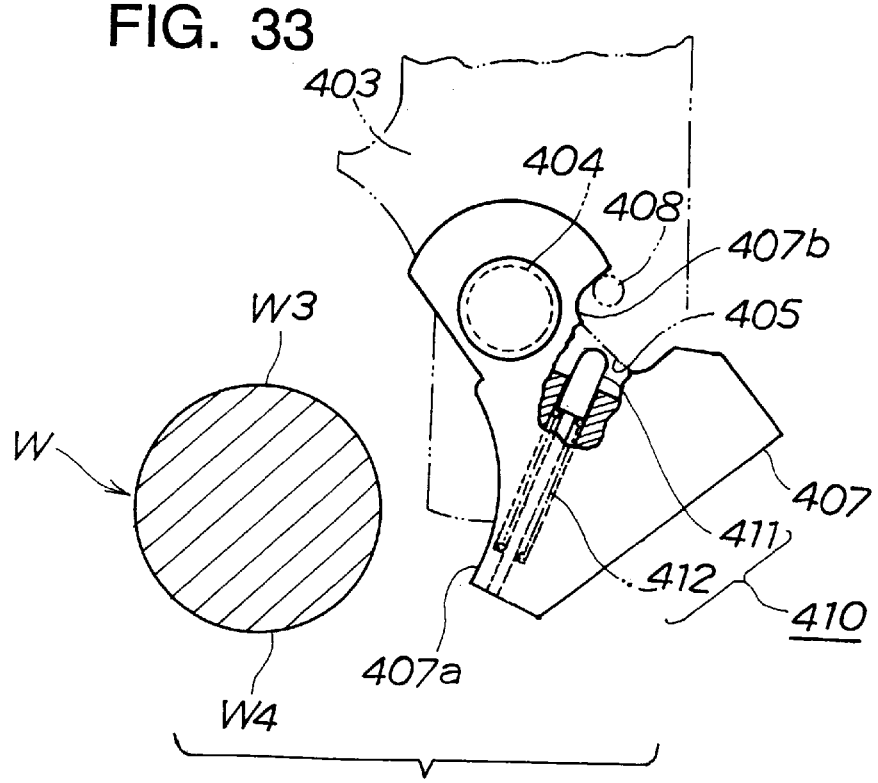
FIG. 33 is a view showing in detail a lower pressing member.

The following paragraphs more fully describe the structure of the upper and lower pressing members 405 and 407, with reference to FIGS. 32 and 33. As shown in FIGS. 32, in each of the upper pressing members 405 pivotably mounted on the bracket 403 via the pin 404, the claw 405a is provided at its distal end, a stopper 408 is formed on its central portion, and a spring securing projection 405b is formed near its proximal end. The upper pressing member 405 is normally biased by the spring 406 in the counterclockwise direction of FIG. 32. Stopper pin 414 limits the counterclockwise pivotal movement of the upper pressing member 405. Reference numeral 405c is a line denoting a stepped portion, the portion to the left of the step line 405c projects toward a viewer of the drawing by a length corresponding to the thickness of the lower pressing member.

As shown in FIG. 33, in each of the lower pressing members 407, pivotably mounted on the bracket 403 via the pin 404, the lower claw 407a is formed at its distal end, a recess 407b is formed near its proximal end, and the spring mechanism 410 is provided within the pressing member 407. The spring mechanism 410 includes a pusher bar 411 and a compression spring 412, and the pusher bar 411 is biased, by the compression spring 412, to be always pressed against the upper pressing member 405 so that the lower pressing members 407 is normally urged to pivot in the clockwise direction with the clockwise pivotal movement being limited by the stopper 408. Because the stopper 408 is a projection formed on the upper pressing member 405, the lower pressing members 407 is caused to pivot along with the upper pressing member 405.

Figure 34A:
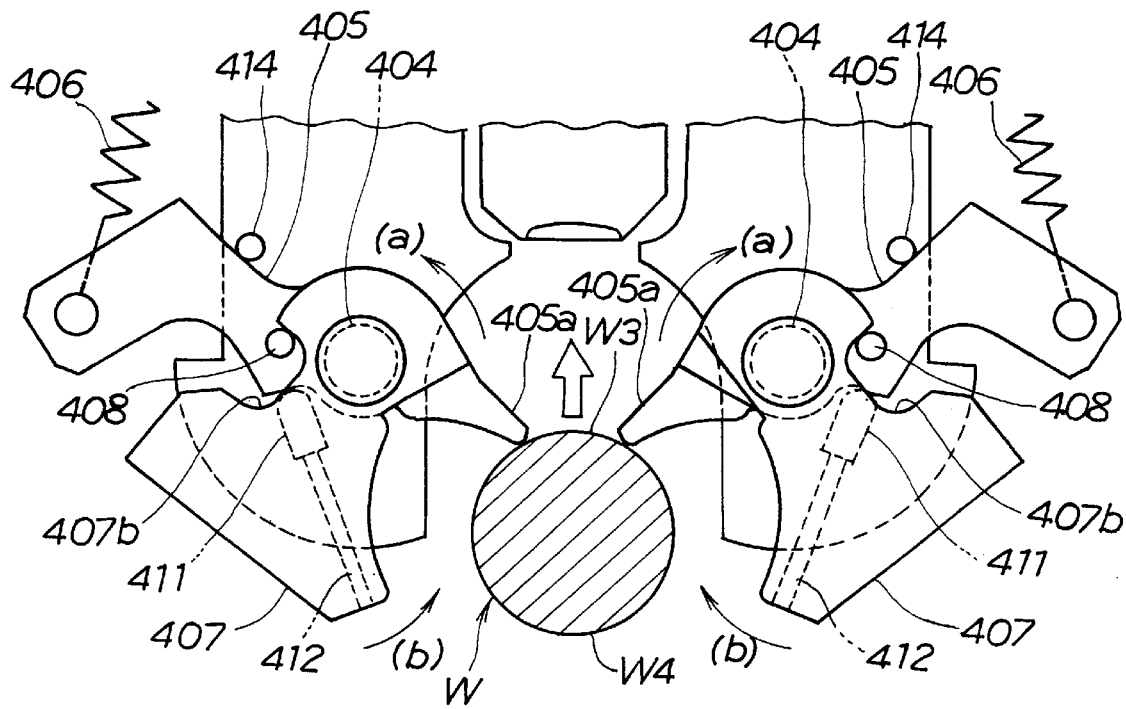
FIGS. 34A and 34B are views explanatory of a former half of operation of the boot positioning apparatus when it grips a small-diameter shaft.
Figure 34B:
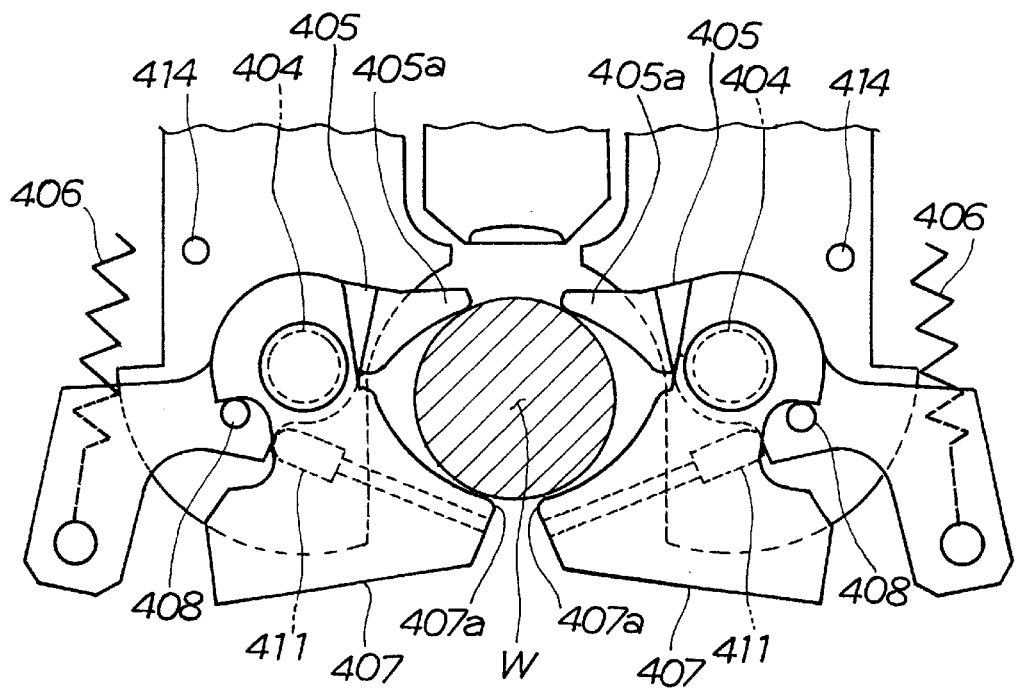

Operation of the above-described boot positioning apparatus will be explained in the following paragraphs, with reference to FIGS. 34A and 34B. FIGS. 34A and 34B are views explanatory of a former half of exemplary operation of the boot positioning apparatus when it grips a small-diameter shaft W by means of the upper and lower pressing members 405 and 407, of which FIG. 34A shows the pressing members 405 and 407 in their respective standby positions; that is, the lower pressing members 407 are in a fully open position, and the upper pressing members 405 are in a position where the respective upper claws 405a directly face a passage for the shaft W.

When the shaft W is moved upward relative to the boot positioning apparatus (this may be done by lowering the apparatus with respect to the shaft W) as denoted by a white arrow in FIG. 34A, the shaft W pushes upward the upper claws 405a of the upper pressing members 405, so that the upper pressing members 405 are caused to pivot about the respective pins 404 in opposite directions (a), (a) against the biasing force of the springs 406. By the pivotal movement of the upper pressing members 405, the lower pressing members 407 are caused to pivot, via the pusher bars 411, in opposite directions (b), (b) against the biasing force of the compression springs 412.

FIG. 34B shows a condition where the upper and lower pressing members 405 and 407 hold therebetween the shaft W; that is, these pressing members 405 and 407 lightly grip the shaft W, from opposite sides, at four points by means of the upper and lower claws 405a and 407a.

Figure 35A:
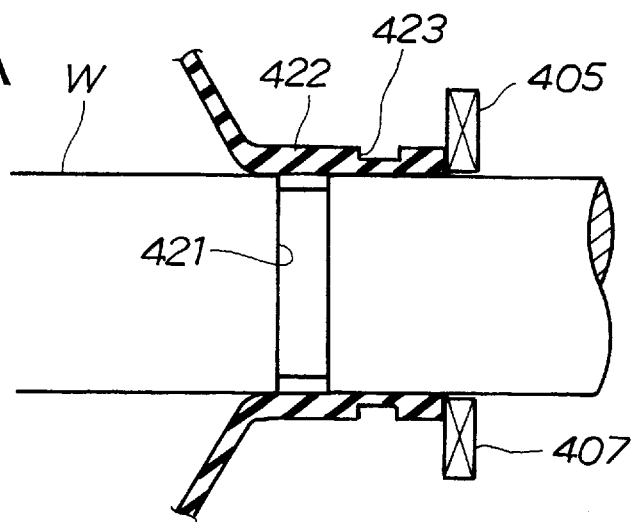
FIGS. 35A and 35C are views explanatory of a latter half of the operation of the boot positioning apparatus when it grips a small-diameter shaft.
Figure 35B:
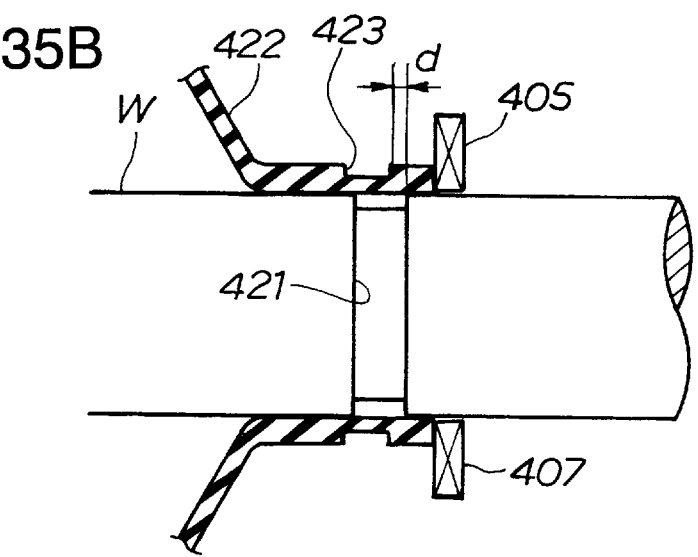

FIGS. 35A and 35B are views explanatory of a latter half of the operation of the boot positioning apparatus, of which FIG. 35A shows the shaft W having its one end covered with a protective boot 422 at the preceding step. The upper and lower pressing members 405 and 407 are placed in contact with the end surface of the boot 422.

Figure 35C:
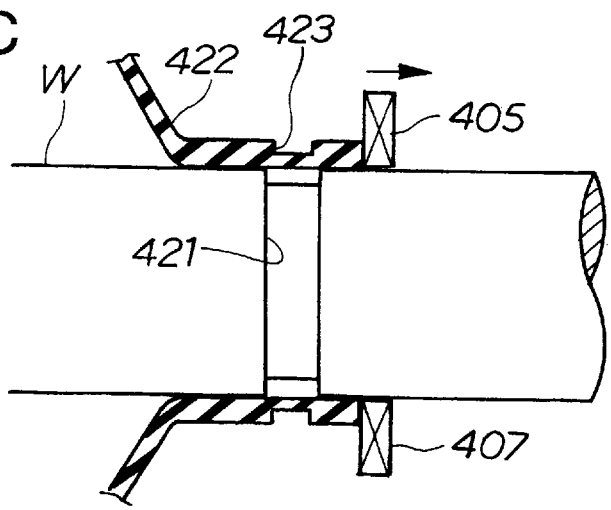

Then, as shown in FIG. 35B, the boot 422 is pushed leftward and thus slightly compressed by leftward movement of the upper and lower pressing members 405 and 407 until a circumferential groove 423 is located past a circumferential groove 421 of the shaft W by distance "d" which may be about 0.5–1.0 mm. After that, as shown in FIG. 35C, the upper and lower pressing members 405 and 407 are moved back in an arrowed (rightward) direction, thereby causing the boot to resiliently expand so that the circumferential grooves 423 and 421 coincide in position.

Figure 36:
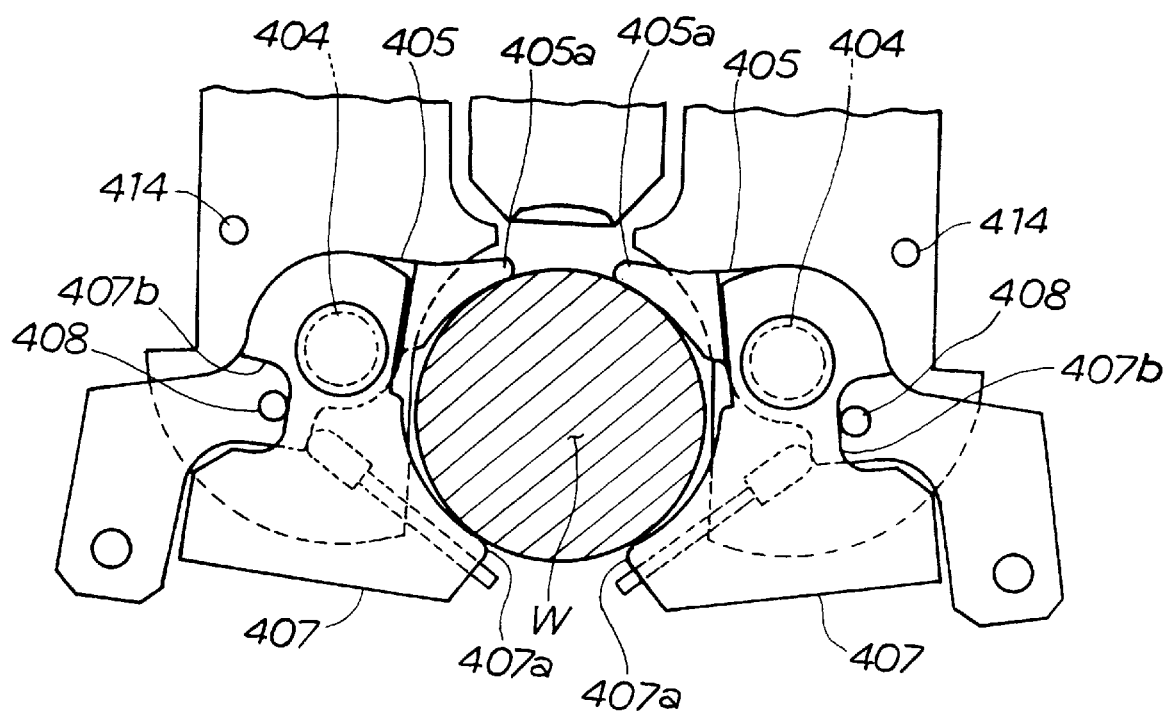
FIG. 36 is a view explanatory of operation of the boot positioning apparatus when it grips a large-diameter shaft.
Figure 37:
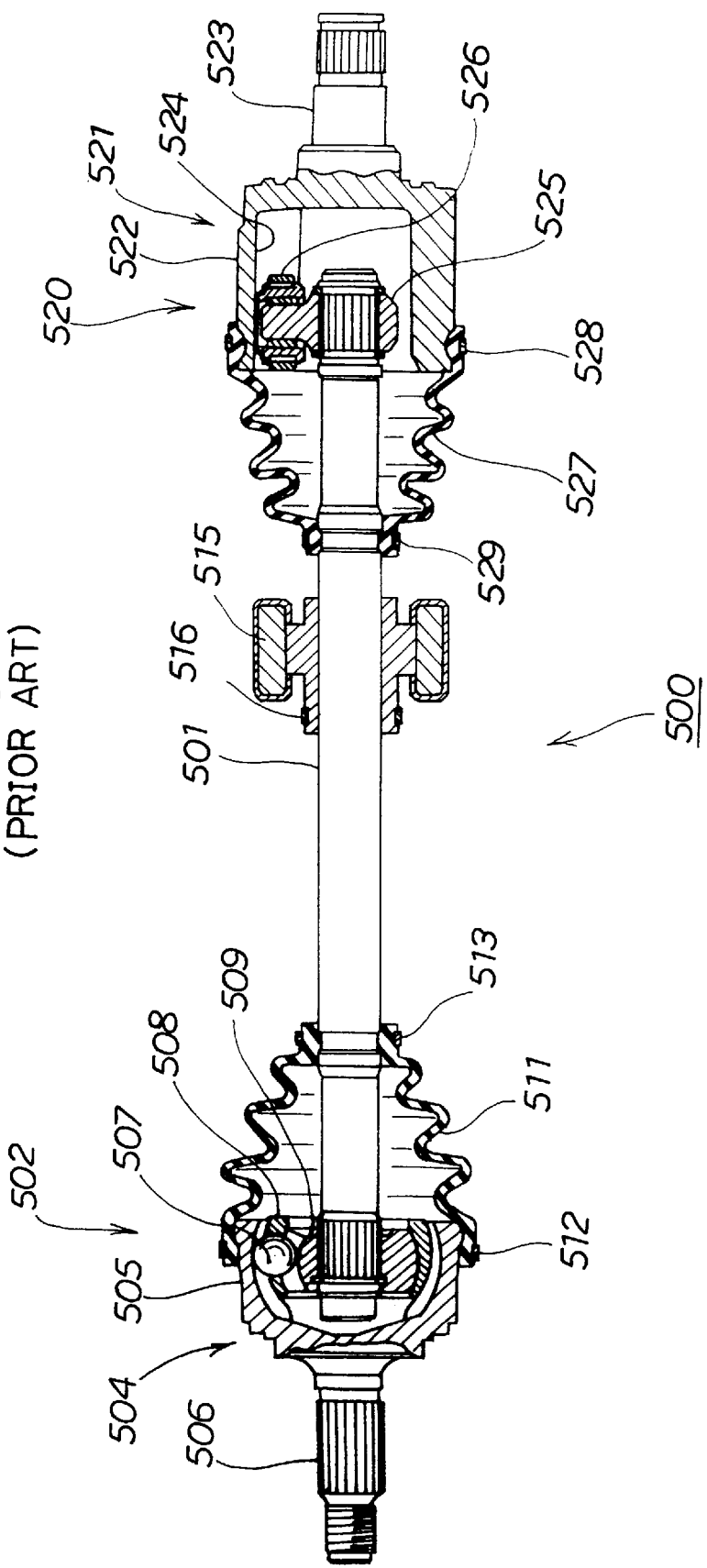
FIG. 37 is a partly-sectional view of the entire constant-velocity joint assembly.
Figure 38:
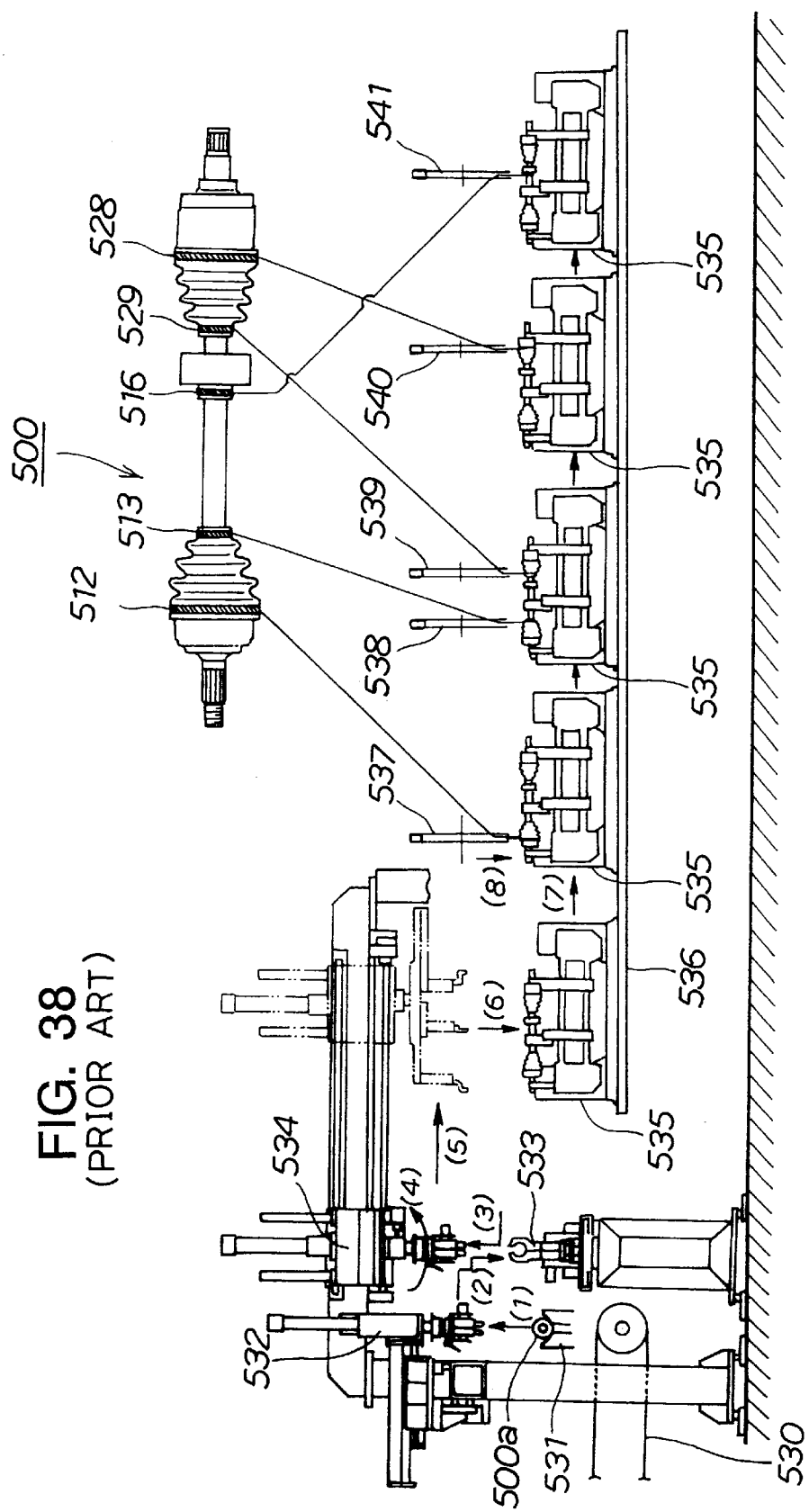
FIG. 38 is a view showing boot-fixing operations in a conventionally-known boot positioning apparatus.
Figure 39A:
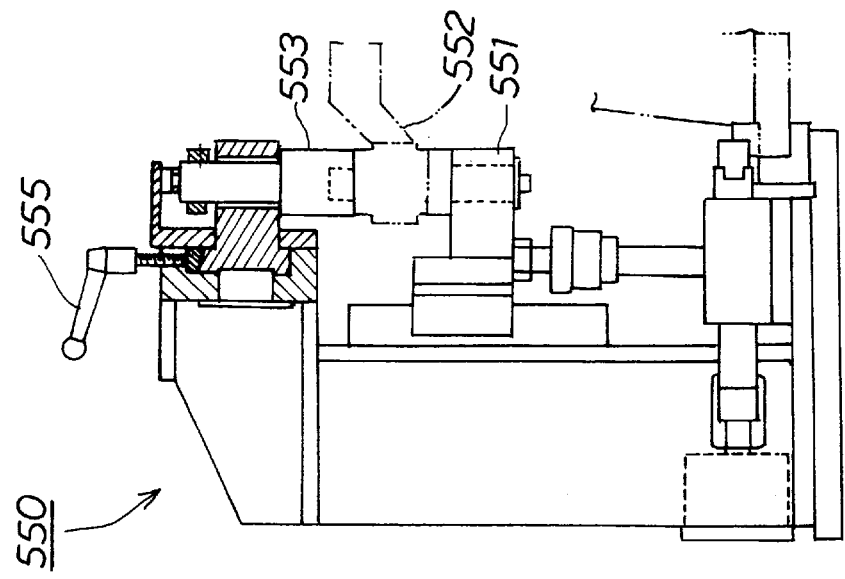
FIGS. 39A to 39C are views showing a structure and operation of the known boot positioning apparatus.
Figure 39B:
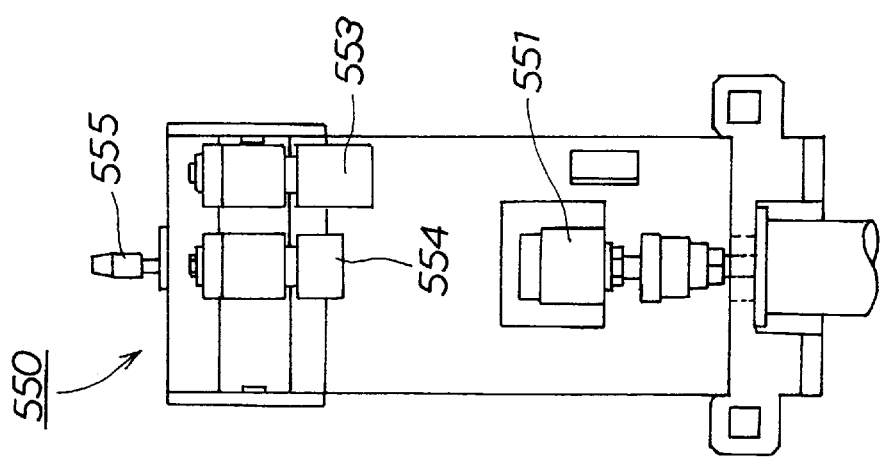
Figure 39C:
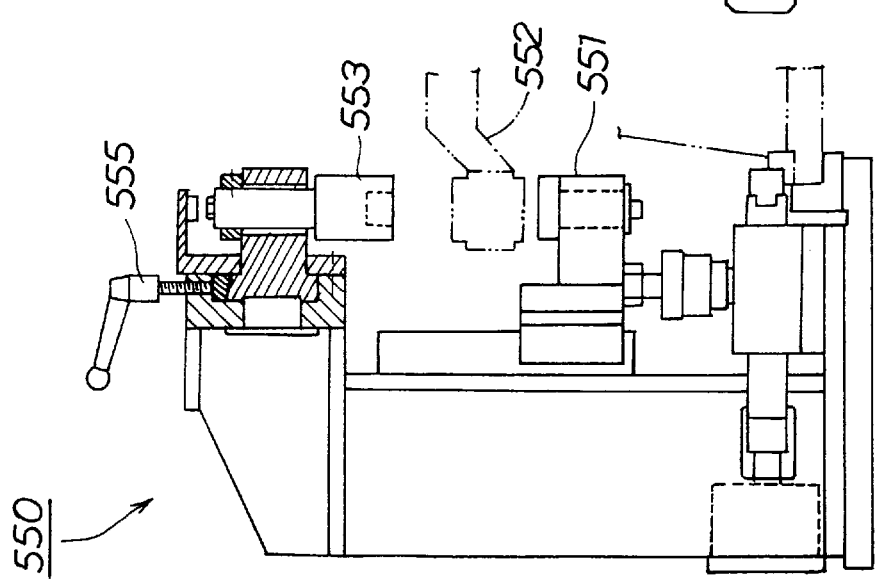
Figure 40:
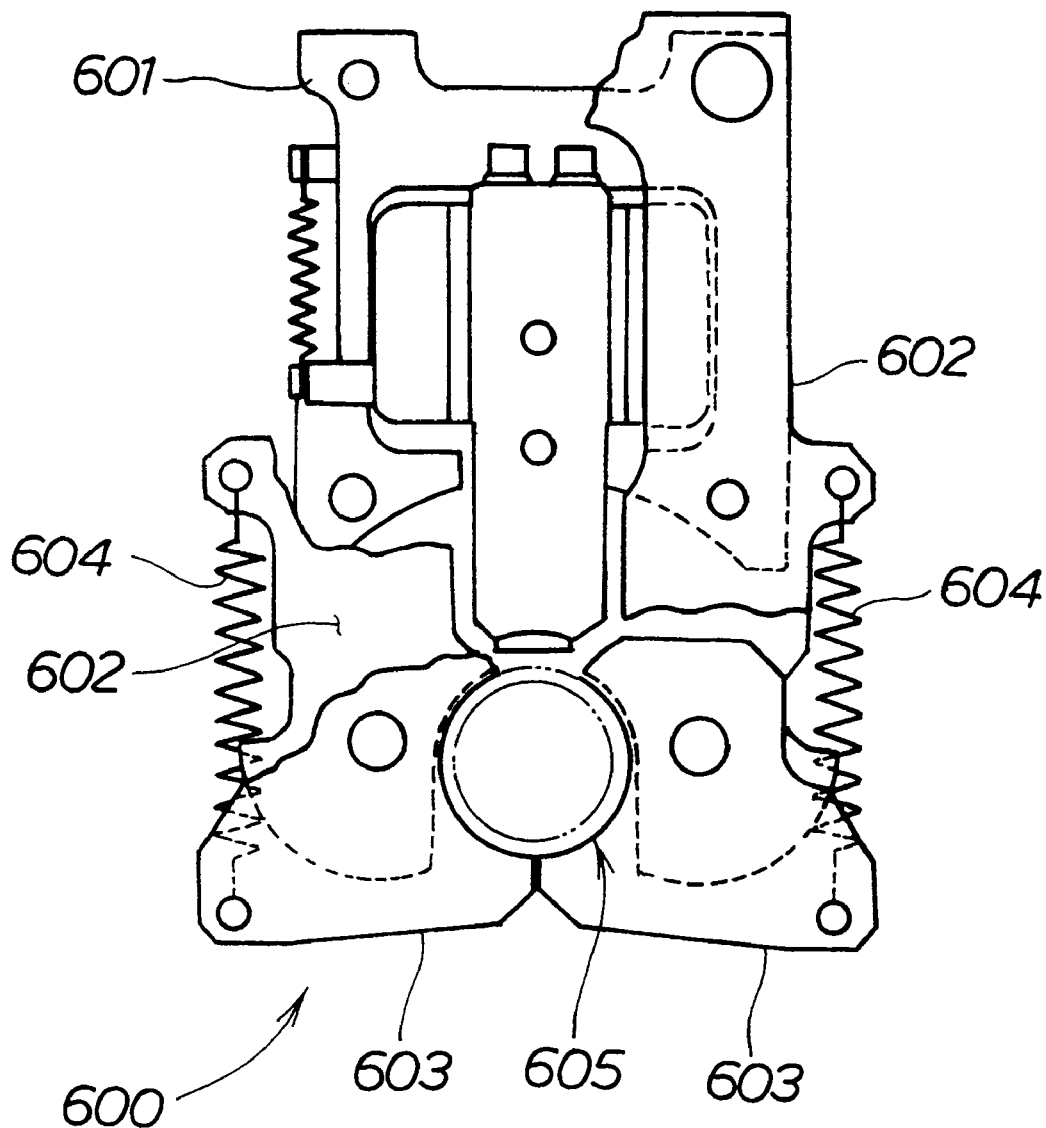
FIG. 40 is a front view of the known boot positioning apparatus.

FIG. 36 is a view showing other exemplary operation of the boot positioning apparatus when it grips a large-diameter shaft W by means of the upper and lower pressing members 405 and 407 opening wider than for the small-diameter shaft W. That is, this boot positioning apparatus is capable of properly gripping a variety of shafts W from the small-diameter to large-diameter.

The spring mechanisms 410 may comprise tension springs or torsional springs rather than the compression springs.

With the above-described arrangement that the shaft W is gripped by the left and right upper claws and lower claws which are freely openable and closeable depending on the diameter of the shaft W, the boot positioning apparatus of the present invention can perform universal boot positioning functions for the shafts of many different diameters. This eliminates the need for changing the pressing members as in the prior art and thus readily permit production of various types of constant velocity joint assembly.

What is claimed is:

1. A constant-velocity-joint-assembly positioning system comprising:
    a boot positioning apparatus including a clamping mechanism for clamping a central drive shaft of a constant velocity joint assembly, a right boot positioning mechanism for positioning a right boot of the joint assembly and a left boot positioning mechanism for positioning a left boot of the joint assembly, said clamping mechanism and said right boot positioning mechanism being selectively adjustable relative to said left boot positioning mechanism so as to vary the distances therebetween;
    a transfer pallet apparatus including first and second adjustable gripping mechanisms for gripping the constant velocity joint assembly and an adjusting mechanism for adjusting the positions of said first and said second gripping mechanisms, said adjusting mechanism being operable based upon differences between current positions and target positions of said first and second gripping mechanisms;
    a vertical position setting apparatus for setting a vertical position of the constant velocity joint assembly when positioned in the transfer pallet apparatus, said vertical position setting apparatus including a plurality of stopper pieces, each said stopper piece corresponding to a differently sized constant velocity joint assembly, and each said stopper piece being automatically positionable for engagement with the corresponding constant velocity joint assembly so as to set the vertical position thereof; and
    a loader apparatus for transferring the constant velocity joint assembly from the boot positioning apparatus to the transfer pallet apparatus, said loader apparatus including first and second loader gripping mechanisms mounted on a pivotable arm for gripping the constant velocity joint assembly and moving mechanisms for moving said first and second loader gripping mechanisms, each said moving mechanism including a servo motor and a feed screw.

2. A constant-velocity-joint-assembly positioning system according to claim 1, wherein said first boot positioning apparatus further includes a feed screw mechanism for moving said central drive shaft clamping mechanism and right boot positioning mechanism to vary distances thereof from said left boot positioning mechanism, and a motor for driving said feed screw mechanism.

3. A constant-velocity-joint-assembly positioning system according to claim 2, wherein said feed screw mechanism includes a first feed screw for moving said shaft clamping mechanism, and a second feed screw for moving said right boot positioning mechanism, and wherein said first and second feed screws are ball screws each having a nut, a screw shaft and balls placed between the nut and the shaft.

4. A constant-velocity-joint-assembly positioning system according to claim 1, wherein said transfer pallet apparatus further includes a first scaling cylinder for monitoring a position of said first gripping mechanism, and a second scaling cylinder for monitoring a position of said second gripping mechanism, and wherein said first and second scaling cylinders monitor respective positions of said first and second gripping mechanisms during positional adjustment thereof by said adjusting mechanism.

5. A constant-velocity-joint-assembly positioning system according to claim 1, wherein said adjusting mechanism includes rotatable feed screws for moving said first and second gripping mechanisms, respectively, in order to adjust positions of said first and second gripping mechanisms.

6. A constant-velocity-joint-assembly positioning system according to claim 5, wherein said adjusting mechanism includes male and female spline members for rotating said feed screws only when said adjusting mechanism is adjusting the positions of said first and second gripping mechanisms, said male and female spline members functioning as brakes when said adjusting mechanism is not adjusting the positions of said first and second gripping mechanisms.

7. A constant-velocity-joint-assembly positioning system according to claim 1, wherein said vertical position setting apparatus further includes:

a base;

a support plate mounted upright on said base;

a lifter mounted on said support plate for vertical movement therealong to vertically move an actuator arm associated with said transfer pallet apparatus supporting the constant velocity joint assembly;

a cylinder for vertically moving said lifter;

a stopper mechanism for setting an upper limit position of said actuator arm depending on a type of the constant velocity joint assembly; and a motor for driving said stopper mechanism.

8. A constant-velocity-joint-assembly positioning system according to claim 7, wherein said motor is an indexing motor, and said stopper mechanism includes a disk-shaped stopper plate rotatable via said indexing motor, and said stopper pieces being fixedly mounted on said stopper plate.

9. A constant-velocity-joint-assembly positioning system according to claim 8, wherein said stopper mechanism includes a pair of position detecting pieces fixed to a shaft of said indexing motor, proximity switches for generating ON/OFF signals in response to said position detecting pieces, a plurality of projections formed on said stopper plate, and an additional proximity switch for generating ON/OFF signals in response to current locations of said projections relative to said additional proximity switch, and wherein said stopper pieces are identifiable from each other on the basis of combinations of the ON/OFF signals.

10. A constant-velocity-joint-assembly positioning system according to claim 7, wherein said motor is a servo motor.

11. A constant-velocity-joint-assembly positioning system according to claim 1, wherein said loader apparatus further includes a horizontal guide rail, a slider mounted on said guide rail for sliding movement therealong, a cylinder unit connected vertically to said slider, and a rotary coupling connecting said pivotable arm to a piston rod of said cylinder unit in such a manner that said arm is horizontally pivotable.

12. A constant-velocity-joint-assembly positioning system according to claim 11, wherein each said right and left boot positioning mechanism includes:

a slider movable along a longitudinal direction of said central drive shaft;

a bracket depending from said slider;

a pair of upper pressing members pivotably supported on said bracket, each of said upper pressing members including an upper claw that is abuttable against an upper surface of said central drive shaft;

springs biasing said upper pressing members in a manner to push said shaft downward;

a pair of lower pressing members pivotably supported on said bracket, each of said lower pressing members including a lower claw that is abuttable against a lower surface of said central drive shaft so as to provide a gripping mechanism in conjunction with the upper claws of said upper pressing members; and a spring mechanism biasing said lower pressing members to place said gripping mechanism in a closed position.

* * * * *